US012136135B2

(12) United States Patent
Dixit et al.

(10) Patent No.: US 12,136,135 B2
(45) Date of Patent: Nov. 5, 2024

(54) ADVANCES IN DATA INGESTION AND DATA PROVISIONING TO AID MANAGEMENT OF DOMAIN-SPECIFIC DATA VIA SOFTWARE DATA PLATFORM

(71) Applicant: Microsoft Technology Licensing, LLC, Redmond, WA (US)

(72) Inventors: Sunil Dixit, Sammamish, WA (US); Eugenio Garcia-Carreras, Greensboro, GA (US); Vincent Wayne Frankson, Watkinsville, GA (US); Nelson Michael Rozo, Seattle, WA (US); Hernan David Maestre Piedrahita, Bellevue, WA (US); Russell Lynn Long, Marietta, GA (US); Kevin Andrew Wiggen, Lafayette, CA (US); Kaushik Barat, Sammamish, WA (US); Manson Ng, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 202 days.

(21) Appl. No.: 16/905,705

(22) Filed: Jun. 18, 2020

(65) Prior Publication Data
US 2021/0398235 A1 Dec. 23, 2021

(51) Int. Cl.
*G06Q 50/20* (2012.01)
*G06F 3/0482* (2013.01)
(Continued)

(52) U.S. Cl.
CPC ......... *G06Q 50/205* (2013.01); *G06F 3/0482* (2013.01); *G06F 16/178* (2019.01);
(Continued)

(58) Field of Classification Search
CPC .... G06Q 50/205; G06Q 50/20; G06F 3/0482; G06F 16/178; G06F 16/2365;
(Continued)

(56) References Cited

U.S. PATENT DOCUMENTS 8,949,939 B2   2/2015  Peddada
11,218,511 B1*  1/2022  Pugalia ................. H04L 63/105
(Continued)

FOREIGN PATENT DOCUMENTS

CN   105976275 A  *  9/2016  ....... G06Q 10/06313
JP   2006179009 A  *  7/2006  ......... G06F 21/6227

OTHER PUBLICATIONS

"International Search Report and Written Opinion Issued in PCT Application No. PCT/US21/026290", Mailed Date: Jul. 23, 2021, 13 Pages.
(Continued)

*Primary Examiner* — Andrew B Whitaker
*Assistant Examiner* — Shaun D Sensenig

(57) ABSTRACT

The present disclosure relates to processing operations configured to improve data ingestion processing for management of domain-specific data through a software data platform. Processing described herein provides technical advantages, provided through a software data platform, that enable a user (e.g., an administrator) of an organization to more easily integrate and manage domain-specific data within a software data platform. A graphical user interface (GUI) of a software data platform is configured to guide an administrative user through data mapping processing so that the administrator can more easily integrate its organizational data into the software data platform. Insights may be automatically generated and provided to the user through the GUI, which may help to guide the administrator through the data mapping process. In further examples, generated
(Continued)

insights may be provided as recommendations (or autocorrections) designed to foster a successful data mapping to aid provisioning of data.

20 Claims, 12 Drawing Sheets

(51) Int. Cl.
    *G06F 16/178*    (2019.01)
    *G06F 16/23*     (2019.01)
    *G06N 5/04*      (2023.01)
    *G06N 20/00*     (2019.01)
    *H04L 67/306*    (2022.01)
    *G09B 5/00*      (2006.01)

(52) U.S. Cl.
    CPC .......... *G06F 16/2365* (2019.01); *G06N 5/04* (2013.01); *G06N 20/00* (2019.01); *H04L 67/306* (2013.01); *G09B 5/00* (2013.01)

(58) Field of Classification Search
    CPC ........ G06F 16/254; G06N 5/04; G06N 20/00; H04L 67/306; G09B 5/00
    See application file for complete search history.

(56) References Cited

U.S. PATENT DOCUMENTS

| | | | |
|---|---|---|---|
| 11,227,504 B1 | 1/2022 | Isgar | |
| 2004/0024776 A1* | 2/2004 | Moore | G09B 5/00 707/999.102 |
| 2007/0038592 A1* | 2/2007 | Haub | G06F 16/907 |
| 2007/0239722 A1* | 10/2007 | Phillips | H04L 67/306 707/999.009 |
| 2011/0264521 A1 | 10/2011 | Straka | |
| 2013/0080346 A1 | 3/2013 | Powell et al. | |
| 2013/0326279 A1* | 12/2013 | Chavda | G06F 11/3672 714/E11.178 |
| 2014/0074896 A1 | 3/2014 | Bushman et al. | |
| 2014/0104175 A1 | 4/2014 | Ouyang et al. | |
| 2015/0295914 A1 | 10/2015 | Kelishadi | |
| 2015/0363795 A1 | 12/2015 | Levy et al. | |
| 2016/0048698 A1 | 2/2016 | Sahu et al. | |
| 2016/0171627 A1* | 6/2016 | Lyubarskiy | G06Q 40/12 705/30 |
| 2016/0321124 A1 | 11/2016 | Baker et al. | |
| 2017/0061719 A1 | 3/2017 | Ruiters | |
| 2017/0078094 A1* | 3/2017 | Olson | H04L 63/08 |
| 2018/0083977 A1 | 3/2018 | Murugesan et al. | |
| 2018/0101887 A1* | 4/2018 | Akkiraju | G06N 5/022 |
| 2018/0113579 A1 | 4/2018 | Johnston et al. | |
| 2019/0102162 A1 | 4/2019 | Pitre et al. | |
| 2019/0108223 A1* | 4/2019 | Fabijancic | G06F 8/30 |
| 2019/0155626 A1 | 5/2019 | Torman et al. | |
| 2019/0171777 A1* | 6/2019 | Sobhy Deraz | G06F 9/54 |
| 2019/0297186 A1 | 9/2019 | Karani | |
| 2019/0332374 A1* | 10/2019 | Harner | G06F 8/10 |
| 2019/0349477 A1 | 11/2019 | Kotak | |
| 2020/0357296 A1 | 11/2020 | Sharma | |
| 2020/0374318 A1* | 11/2020 | Polando, Jr. | H04L 63/205 |
| 2021/0397987 A1 | 12/2021 | Dixit et al. | |
| 2023/0267346 A1 | 8/2023 | Dixit et al. | |

OTHER PUBLICATIONS

"International Search Report and Written Opinion Issued in PCT Application No. PCT/US21/026291", Mailed Date: Jun. 30, 2021, 15 Pages.
"Configure Teams for Education", Retrieved from: https://docs.microsoft.com/en-gb/microsoft-365/education/deploy/set-up-teams-for-education, Oct. 1, 2019, 2 Pages.
"Grade Sync", Retrieved from: https://docs.microsoft.com/en-gb/schooldatasync/grade-sync, Jun. 4, 2020, 1 Page.
"Non Final Office Action Issued in U.S. Appl. No. 16/905,749", Mailed Date: Jun. 22, 2022, 24 Pages.
"Notice of Allowance Issued in U.S. Appl. No. 16/905,749", Mailed Date: Dec. 21, 2022, 27 Pages.
Non-Final Office Action mailed on Dec. 21, 2023, in U.S. Appl. No. 18/309,027, 24 pages.
Final Office Action mailed on Jul. 8, 2024, in U.S. Appl. No. 18/309,027, 26 pages.

* cited by examiner

100

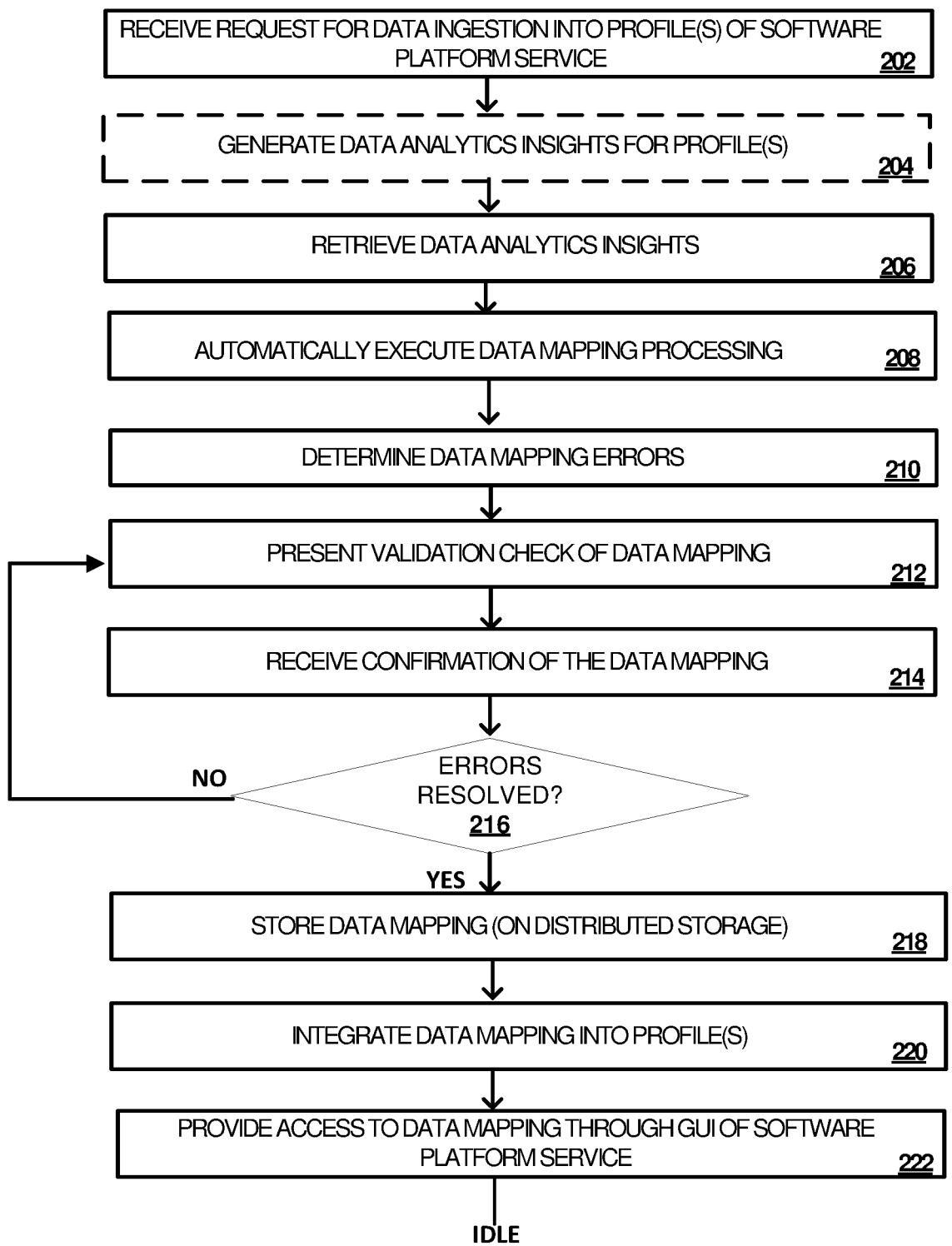

340

360

380

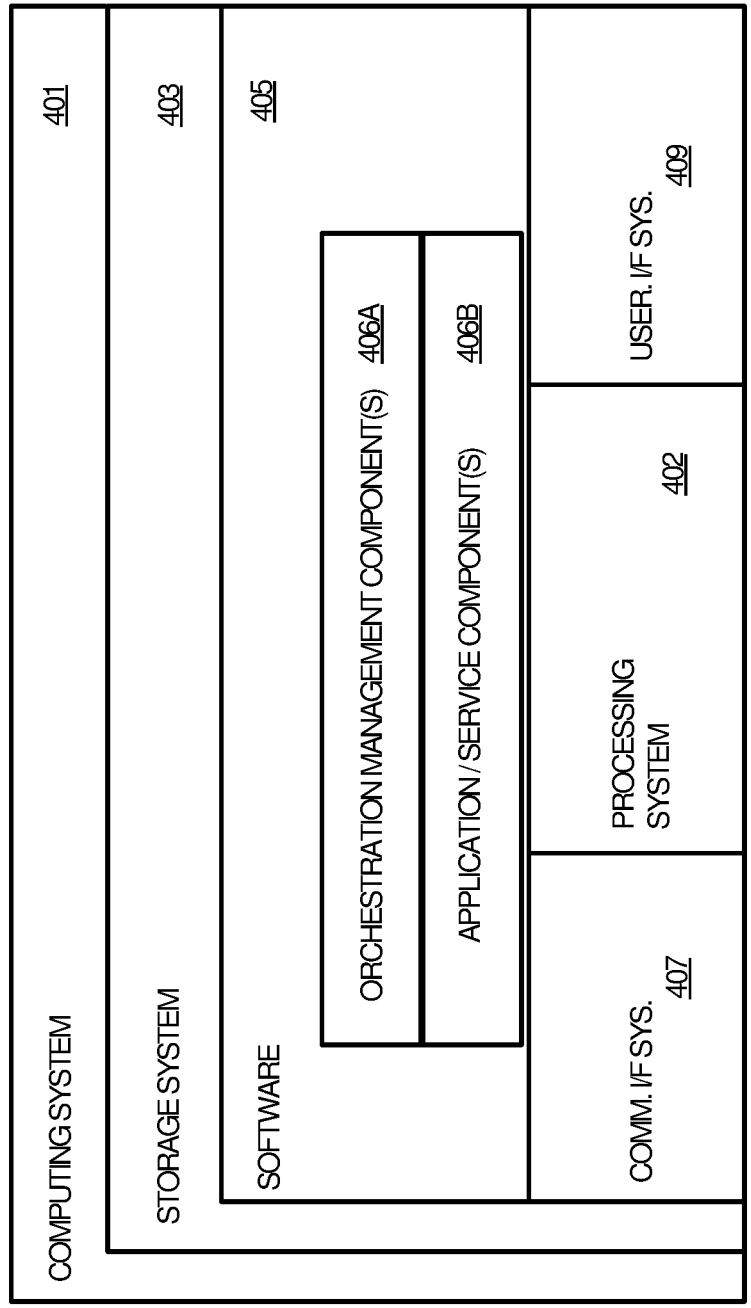

ADVANCES IN DATA INGESTION AND DATA PROVISIONING TO AID MANAGEMENT OF DOMAIN-SPECIFIC DATA VIA SOFTWARE DATA PLATFORM

BACKGROUND

Organizations such as educational organizations implement software systems to manage their data. In doing so, valuable and sensitive organizational data is often required to be shared with different entities to enable access to features, programs, and applications, etc. However, it can be challenging for these organizations to effectively integrate, store, and manage its data in a manner that is both efficient from a processing standpoint as well as secure from a privacy standpoint. These challenges exist due to: fragmentation of information systems; non-interoperability of information systems due to the lack of data integration consistent with standards; legacy solutions which are hard to integrate; resource constraints; lack of visibility into how data is being shared between systems; and distributed data integrations which are hard to maintain and manage, among other technical issues.

Existing solutions to the problems above are quite often found to be expensive and hard to implement. With the wide variety of integration technologies and countless vendor specifications, integrations and updates thereof often become unmanageable. In an educational-specific domain example, educational organizations are asked to provide numerous types of data for each specific vendor they work with. This can also become more difficult as software platforms for managing educational data seek expansive third-party solutions to aid data management of domain-specific data. Educational organizations are bombarded with data requests from most of its software vendors and visa-versa. As such, the need for data exchange has never been greater. The cost of setting up each of these exchanges is often costly and time consuming. It is likely that all independent software vendors (ISV) may need to consume and produce similar data to support integration of ISVs services in an educational environment. At present, educational organizations must work to hire, purchase or produce customer data integration feeds for each ISV as needed. This is repetitive and inefficient from a processing (and resource) standpoint. Moreover, as the customer data being worked with is sensitive (e.g., often personally identifiable information), protected health data about students, data governance and compliance also present constant and significant technical challenges. As such, there is a need for personalized management of domain-specific customer data, for example, where educational organizations are in complete control of their own data.

Furthermore, the ISVs go through complex and often expensive processes to capture and share data from each of their applications/services. Data sharing and retrieval is costly due to the expense to create, maintain and implement the integrations necessary. Many ISV's find themselves needing data from a school information system (SIS), student management systems or other educational data sources to integrate their software. This need is also prevalent in other domains that such as human resources (HR), nursing, special education, etc. In the US alone, there are over 130 different SIS vendors. Worldwide that number becomes even larger. There are also many learning management systems (LMS), content assessment and other educational companies. However, in traditional software data platforms, there are very limited ways (if any) to bring all of the data together while also making sense of how to integrate that data. As such, there is a technical need to improve data ingestion processing, data provisioning, data quality, data consistency each driven by graphical user interfaces to aid user management of domain-specific data.

SUMMARY

In view of the foregoing technical challenges, the present disclosure relates to processing operations configured to improve data ingestion processing for management of domain-specific data through a software data platform. Processing described herein provides technical advantages, provided through a software data platform, that enable a user (e.g., an administrator) of an organization to more easily integrate and manage domain-specific data within a software data platform. For instance, a graphical user interface (GUI) of a software data platform is configured to guide an administrative user through data mapping processing so that the administrator can more easily integrate its organizational data into the software data platform. In doing so, insights may be automatically generated and provided to the user through the GUI, which may help to guide the administrative user through the data mapping process. In further examples, generated insights may be provided as recommendations (or autocorrections) designed to foster a successful data mapping so that a user can provision its organization data in a manner that further relationships with ISVs as well as maximizes the software/services accessible through the software data platform (for other users of an organization). For instance, domain-specific data may be integrated within a software data platform and shared with a plurality of ISVs (and services of the educational platform service) with a single data mapping.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 2 illustrates an exemplary method for data ingestion including improved data mapping for integrating data into a software data platform, with which aspects of the present disclosure may be practiced.

FIG. 4 illustrates a computing system suitable for implementing processing operations described herein related to domain management via a software data platform, with which aspects of the present disclosure may be practiced.

DETAILED DESCRIPTION

Figure 1:
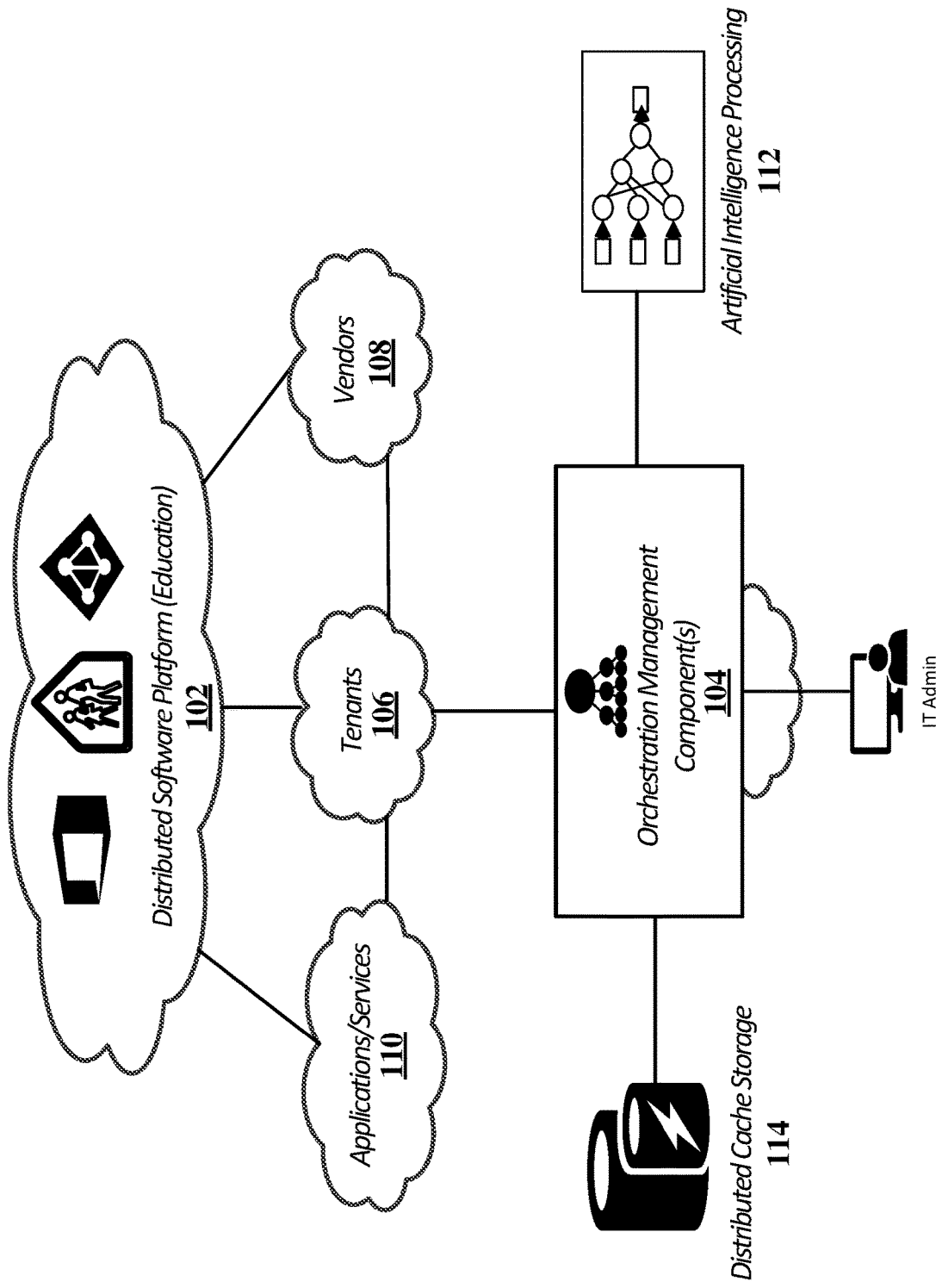
FIG. 1 illustrates an exemplary system diagram of components interfacing to enable improved domain management for integrating data into a software data platform and provisioning the data for subsequent usage, with which aspects of the present disclosure may be practiced.

As referenced in the foregoing, the present disclosure relates to processing operations configured to improve data ingestion processing for management of domain-specific data through a software data platform. Processing described herein provides technical advantages, provided through a software data platform, that enable a user (e.g., an administrator) of an organization to more easily integrate and manage domain-specific data within a software data platform. For instance, a graphical user interface (GUI) of a software data platform is configured to guide an administrative user through data mapping processing so that the administrator can more easily integrate its organizational data into the software data platform. In doing so, insights may be automatically generated and provided to the user through the GUI, which may help to guide the administrative user through the data mapping process. In further examples, generated insights may be provided as recommendations (or autocorrections) designed to foster a successful data mapping so that the user can provision its organization data in a manner that further relationships with ISVs as well as maximizes the software/services accessible through the software data platform (for other users of an organization). For instance, domain-specific data may be integrated within a software data platform and shared with a plurality of ISVs (and services of the educational platform service) with a single data mapping.

With respect to domain-specific data being integrated and provisioned for usage through a software data platform, the present disclosure is designed to improve data ingestion processing and data provisioning processing for an administrative user account that is managing its domain-specific data for an organization (e.g., educational organization). This enables users/members of an organization to utilize features/services through a software data platform which may further be extensible to comprise features provided by ISVs. However, it is to be understood that processing operations herein are applicable to any type of user account and is not restricted specifically to an administrative user account. For ease of explanation, a non-limiting example of a domain data is educational data for an educational organization (e.g., including pre-school, K12 and higher education). However, it is to be understood that the present disclosure is configurable to work with any type of domain administrated by any type of organization without departing from the spirit of the present disclosure.

A non-limiting example of an administrative account is that of an information technology (IT) admin which is associated with an educational organization. The IT admin may be responsible for managing educational data associated with a schools/school districts as well as sharing of that educational data with entities such as a plurality of ISVs and a software data platform (e.g., educational platform service). The software data platform (e.g., educational platform service) may be configured as a management information system configured for a specific content purpose. In the educational example, the software data platform is an educational platform service that acts as a hierarchical management information system (e.g., SIS or LMS) for educational establishments to manage educational data (e.g., identifiable data of students of an educational organization). In doing so, the educational platform service provides access to a plurality of applications/services that enable the administrative user account to management the educational data as well as provision the data so that users (e.g., students, teachers) associated with a data profile have access to features provided through the educational platform service and extensible features provided by ISVs. Such features include but are not limited to capabilities for: registering students in courses; conducting online learning/classes; documenting gradings, transcripts, results of student tests and other assessments; building student schedules; tracking student attendance; managing data for extracurricular activities; and managing student-related data needs in a school, among other examples.

The GUI of the education platform service provides a school IT admin with a customized GUI that is configured to allow the admin to manage integration of its educational data across a plurality of ISVs (and services of the educational platform service) with a single data mapping. The goal is to put the educational institution in charge of their own data integrations without being inundated with requests (e.g., from a plurality of ISVs). The GUI of the education platform service further provides an administrative user account with a high-level overview of system functionality as well as GUI features that easily identifying actions that the IT admin needs to take as well as optional actions that the IT admin can apply to improve functionality and user experience (e.g., provide a richer experience for its users). For instance, intuitive automated data mapping processing may provide suggested data transformations for usage of the data once it is integrated into the education platform service. Additionally, the GUI is further configured to provide GUI features to assist an administrator with data ingestion processing even in cases where the administrator is inexperienced with using the education platform service or specific programming/data formats that the administrator may be working with. Telemetry analytics may further be provided for the administrative user through the GUI to aid with decision-making including but not limited to: how to setup a data mapping; data transformations for integrating data into the education platform service; what data to include in the data mapping; and storage of mapped data, among other examples. Non-limiting examples of a GUI of an education platform service are illustrated in FIGS. 3A-3I.

In one non-limiting example, a request to integrate data into a data profile (e.g., synchronized education profile) of a software data platform (e.g., education platform service) is received from a user account such as an administrative user account. A non-limiting example of an administrative user account is that which manages data for one or more educational institutions, whereby the administrative user account may manage the data profile on behalf of an organization (e.g., the one or more educational institutions). Data analytics insights for the data profile may be retrieved through the software data platform, where the data analytics insights are configured to aid the administrative user account with integration of their data into the data profile. As an example, the data analytics insights are generated by application of trained artificial intelligence (AI) processing that determines the data analytics insights by analyzing signal data pertaining to one or more of: usage of the administrative user account; a tenant configuration (e.g., data profile/synchronized education profiles) associated with the administrative user account; features/services provided through the educational platform service; and one or more software vendors associated with a tenant configuration or otherwise available for integration within the tenant configuration, among other types of signal data.

Continuing the above example, in response to receiving the request to integrate data, a component of the software data platform automatically executes data mapping processing on behalf of the administrative user account. Automated processing may utilize the data analytics insights (and results of analysis thereof) to generate a data mapping for integration of the data into the data profile of the software data platform. In an educational example, the data mapping processing maps the data of a data file to educational data fields associated with the synchronized education profile. As the data analytics insights are further configured to aid the administrative user account during data ingestion processing, the automatically executing of the data mapping processing further generates one or more recommendations to aid data mapping. Exemplary recommendations may be provided based on the data analytics insights that utilized to assist the administrative user account with validation of the data mapping.

A validation check of the data mapping may be presented to the administrative user account through the GUI of the software data platform. This may include presenting validation errors or review of mapping fields that need user review. In a non-limiting example, presentation of the validation check comprises surfacing, through the GUI, one or more recommendations for the data mapping that are generated from the data analytics insights. If validation errors occur, the validation check may further present validation errors and insights and/or autocorrections to aid remediation.

Furthermore, trained AI processing may be configured to automate the data mapping process on behalf of the administrative user. This may comprise generation of data analytics insights to aid with data mapping processing. In some examples, data analytics insights (and recommendations therefrom) may be presented to the administrative user during the validation check. In at least one instance, automated execution of the mapping processing comprises determining required educational data fields that pertain to a current configuration of the synchronized education profile relative to one or more of: services of the education platform service and services associated with the one or more software vendors. In further instances, automated execution of the mapping processing comprises determining optional educational data fields that, if activated, would enhance a user experience for users associated with the synchronized education profile relative to one or more of: the services of the education platform service and the services associated with the one or more software vendors. When the validation check is presented to the administrative user, the GUI may be configured to disambiguate the required educational data fields from the optional data fields. This enables an administrative user to more clearly understand how their data is being used and how to provision the data when it comes to integration with ISVs and features of the educational platform service.

As referenced above, in some examples, data mapping processing may result in determination of data mapping errors when mapping data of a data file to educational fields for usage through the education platform service. Presentation of a validation check may comprise presenting, through a GUI, identification of any data mapping errors to aid resolution of the data mapping error on behalf of the administrative user account. In at least one example, determination of a data mapping error may comprise utilizing the data analytics insights to recommend an input value for one or more of the educational data fields associated with the data mapping error, where a recommendation for the input value is provided in the validation check to aid resolution of the data mapping error. In essence, this provides a suggested data transformation to aid data mapping on behalf of the administrative user before the administrative user has to intervene. In some technical instances, a recommendation for an input value may be a curated listing of input values that may be most applicable to a specific educational data field in an education platform service. For instance, application of trained AI processing may execute ranking processing that identified the most application input values for a data type (e.g., through confidence scoring) so that unnecessary options are not presented to a user.

In other examples, determination of a data mapping error may comprise utilizing the data analytics insights to generate an autocorrection of the data mapping error. Presentation of a validation check may comprise presenting a GUI element identifying the autocorrection of the data mapping error for the administrative user account. In further examples, specific data analytics insights may be provided through a GUI. In examples where an autocorrection is applied, a data analytics insight may identify the administrative user a rationale as to why the autocorrection was automatically applied. An exemplary rationale may have a basis on a collective analysis of one or more of: the synchronized education profiles associated with the administrative user account; the features/services provided through the educational platform service and the signal data pertaining to one or more software vendors.

Exemplary technical advantages provided by processing described in the present disclosure comprise but are not limited to: generating and rendering of an improved GUI that enables presentation of customized GUI features for data ingestion processing and data provisioning processing; implementation of automated data mapping processing to aid users with integration of domain-specific data (e.g., educational data) for usage through a software data platform (e.g., educational platform service); improving processing efficiency (e.g., reduction in processing cycles, saving resources/bandwidth) for computing devices executing data ingestion processing and data provisioning; better management of computing resources in a distributed service example where a data profile of a software data platform is integrating with a plurality of ISVs; novel configuration of artificial intelligence (AI) processing to generate data analytics insights that enhance data mapping processing and presentation of a GUI; better management of data through distributed data storage; and interoperability to enable integration of domain-specific data into a software data platform that provides users with access to a plurality of different features, applications/services, etc., of a software data platform and/or ISVs thereby improving usability and user experiences of a software data platform, among other technical advantages.

FIG. 1 illustrates an exemplary system diagram 100 of components interfacing to enable improved domain management for integrating data into a software data platform and provisioning the data for subsequent usage, with which aspects of the present disclosure may be practiced. As an example, components illustrated in system diagram 100 may be executed by an exemplary computing system 401 (or multiple computing systems) as described in the description of FIG. 4. System diagram 100 describes components that may be utilized to execute processing operations described in method 200 (FIG. 2), processing associated with visual diagrams of FIGS. 3A-3I and the accompanying description. Moreover, interactions between components of system diagram 100 may be altered without departing from the spirit of the present disclosure. Exemplary components, described in system diagram 100, may be hardware and/or software components, which are programmed to execute processing operations described herein. In some examples, components of system diagram 100 may each be one or more computing devices associated with execution of a specific service. Exemplary services may be managed by a software data platform that also provides, to a component, access to and knowledge of other components that are associated with applications/services. In one instance, processing operations described in system diagram 100 may be implemented by one or more components connected over a distributed network, where a user account (e.g., administrative user account) may be working with a specific data profile established through a software data platform. System diagram 100 comprises a distributed software platform 102; an orchestration management component 104; tenants 106; vendors 108; applications/services 110; AI processing 112 and a distributed cache storage 114.

The distributed software platform 102 may be a software system connecting components thereof over a distributed network connection. Implement of components to enable operation of components of a software data platform over a network connection are known to one skilled in the field of art. For instance, the distributed software platform 102 may be backed by one or more services to enable the distributed software platform 102 to be implemented in a variety of different technical scenarios including but not limited to: software as a service (SaaS), platform as a service (PaaS) and infrastructure as a service (IaaS). Moreover, the distributed software platform may support many different programming languages, tools, and frameworks, etc., including both organizationally proprietary systems (e.g., Microsoft®-specific and third-party software and systems including those of ISVs).

In examples described herein, the distributed software platform 102 is configured for a specific content purpose such as education (e.g., MICROSOFT® Education, GOOGLE® for Education). In the educational example, the distributed software platform 102 is an educational platform service that acts as a hierarchical management information system (e.g., SIS or LMS) for educational organizations to manage its educational data (e.g., identifiable information pertaining to students, schools, school districts). Integration of educational information systems for traditional purposes is known to one skilled in the field of art. The distributed software platform 102 provides access to a plurality of applications/services that enable the administrative user account to manage its own educational data as well as provision the education data via tenants 106 so that users of a tenant configuration have access to features and services provided through the distributed software platform 102 and extensible features provided by ISVs. For instance, ISVs may interface with the distributed software platform 102 and/or specific organizations (e.g., educational institutions) to enable access to features/services of the ISV via the distributed software platform 102. Such features include but are not limited to capabilities for: registering students in courses; conducting online learning/classes; documenting gradings, transcripts, results of student tests and other assessments; building student schedules; tracking student attendance; managing data for extracurricular activities; and managing student-related data needs in a school, among other examples. In the example of a well-known software data platform example, Microsoft365®, may be integrated into the distributed software platform 102 to provide access to applications/services for furthering of an educational experience. As indicated in foregoing, there are numerous technical challenges with respect to traditional implementations of software data platforms when it comes to data ingestion of domain-specific data, data provisioning and GUI functionality that is provided to specific user accounts. Integration of an exemplary orchestration management component 104 is configured to resolve technical challenges as well as enable the distributed software platform 102 to provide an improved GUI to aid a user account (e.g., administrative user account) with data ingestion processing and data provisioning processing.

The GUI of the distributed software platform 102 provides a school IT admin with a customized GUI experience that is configured to allow the admin to manage integration of its educational data across a plurality of ISVs (and services of the educational platform service) with a single data mapping. The goal is to put the educational institutions in charge of their integrations without being inundated with requests (e.g., from ISVs). The GUI of the distributed software platform 102 provides an administrative user account with a high-level overview of system functionality. Furthermore, the GUI of the distributed software platform 102 provides GUI features that easily identify actions that the IT admin is required to take as well as optional actions that the IT admin can activate to improve functionality and user experience (e.g., provide a richer experience for its users). For instance, intuitive automated data mapping processing may provide suggested data transformations for usage of the data once it is integrated into the distributed software platform 102 (e.g., education platform service). Additionally, the GUI is further configured to provide GUI features to assist an administrator with data ingestion processing even in cases where the administrator is inexperienced with using the education platform service or specific programming/data formats that the administrator may be working with. Telemetry analytics may further be provided for the administrative user account through the GUI to aid with decision-making including but not limited to: how to setup a data mapping; data transformations for integrating data into the education platform service; what data to include in the data mapping; and storage of mapped data, among other examples. Non-limiting examples of a GUI of an exemplary distributed software platform 102 are illustrated in FIGS. 3A-3I.

The orchestration management component 104 comprises one or more components that are configured to manage data relationships pertaining to the distributed software platform 102. In one example, the orchestration management component 104 may be a component of the distributed software platform 102. However, in some alternative examples, the orchestration management component 104 may be a component that is external to the distributed software platform 102 interfacing therewith over a network connection. Specific processing operations executed by the orchestration management component 104 comprise processing operations referenced in the description of method 200 (FIG. 2) and the accompanying description of FIGS. 3A-3I in addition to those described herein.

With respect to the management of relationships pertaining to the distributed software platform 102, the orchestration management component 104 enables an administrative user account of an organization (e.g., school IT admin for an educational institution) to manage relationships that are specific to tenant 106 created through the distributed software platform 102. An exemplary tenant 106 may be a configuration set for a group of users for utilization of the distributed software platform 102. For instance, a tenant 106 may correspond to a data profile created within the distributed software platform 102. An example of a data profile is a synchronized education profile (e.g., for an education platform service) that provides a specific configuration of the distributed software platform 102 for one or more educational institutions whereby the synchronized education profile provides access to vendors 108 (e.g., ISVs) applications/services 110 of the distributed software platform 102. A synchronized education profile may be utilized by one or more users of an educational institution (e.g., groups of users such as students, teachers) to access functionality provided through the distributed software platform 102 that comprises access to features providing an SIS or LMS. A tenant 106 (e.g., a synchronized education profile) may be managed by the administrative user account, where the administrative user account can manage its domain-specific data (e.g., educational data for the one or more educational institutions) for usage through the distributed software platform 102 including sharing of the educational data to interface with vendors 108 and application/services 110 of the distributed software platform 102. In examples where an administrative user account is managing more than one educational institution, tenants 106 may be created to respectively manage individual educational institutions (or a specific group of educational institutions). Education/educational data is specific to the one or more educational institutions. Non-limiting examples of education data comprise but are not limited to: personally identifiable data of people associated with an educational institution including but not limited to: data identifying registered students, teachers, school administrators, etc.; data identifying rostering within an educational institution (or school district) including classes/grades; data identifying any of gradings, transcripts, student attendance; school programs; extracurricular activities; results of student tests and other assessments; etc.; data identifying building student schedules; data identifying parents/families of people associated with an educational institution (e.g., relationships of students); data identifying locations and physical inventory associated with an educational institution; data identifying preferences including preferences for usage of specific features, applications/services, etc.; and data identifying computing resources associated with an educational institution, among other examples.

As identified above, an administrative user account may manage relationships associated with a tenant 106 including how educational data is used within the distributed software platform 102 and subsequently shared with vendors 108 and application/services 110 of the distributed software platform 102. For instance, specific vendors 108 (e.g., ISVs) may be associated with a specific tenant 106 providing access to vendor-specific features through the distributed software platform 102. In some instances, vendors 108 may have a contractual relationship with one or more educational institutions and the distributed software platform 102. An administrative user account may be responsible for management of contractual relationships with vendors 108 whereby features and services may be provided to designations of user accounts associated with a specific tenant 106. This includes management of specific education data that is sharable with vendors 108, for example, to enable features and services provided by the vendor 108 through the distributed software platform 102 or other type of software modality. The orchestration management component 104 may be further configured to enable management of contractual relationships between an administrative user account and the vendors 108 and/or with the services provided through the distributed software platform 102. In specific examples, a GUI associated with a distributed software platform 102 (e.g., education platform service) is configured to provide GUI elements specific to the management of such contractual relationships including but not limited to: term of a contractual relationship; activation/disabling of specific features and services; and sharing permissions associated with educational data, among other examples. Furthermore, the orchestration management component 104 may be further configured to generate data analytics insights based on signal data obtained through monitoring of the contractual relationships. As the distributed software platform 102 is expansive enough to incorporate a plurality of different applications/services, including communication/messaging applications/services, signal data may be collected and analyzed to determine state/status associated with a contractual relationship. This information may be analyzed and presented to the administrative user account in a useful manner to aid data ingestion and data provisioning of education data, for example, where data analytics insights may be surfaced through a GUI, recommendations, autocorrections, etc.

The administrative user account may further utilize the orchestration management component 104 to manage the education data itself, including creating/modifying data mappings of the education data for usage through the distributed software platform 102 and data provisioning that enables utilization of the education data (by the distributed software platform 102 and/or ISVs). This enables an administrative user account to provide other user accounts (e.g., students and teachers) associated with a tenant 106 with a rich and comprehensive user experience through the distributed software platform 102. The administrative user account may further manage sharing of its education data with specific features/services of the distributed software platform 102, whereby education data (e.g., all, some, none) may be enabled through the distributed software platform 102 to allow usage of specific features or services and/or features and services provided by the vendors 108. Specific processing operations pertaining to data mapping processing, executed via the orchestration management component 104 are described in the description of method 200 (FIG. 2).

The orchestration management component 104 may be configured to interface with AI processing 112 to aid data ingestion and data provisioning of education data including the automated creation of an exemplary data mapping of education data. In one example, automation of data mapping processing may be programmed to execute through a software module, trained AI modeling or a combination thereof. Above what is traditionally known, AI processing 112 described herein may be trained to generate and retrieve data analytics insights that may aid decision-making for automating the data mapping processing and data provisioning including generation of recommendations/suggestions/autocorrections for the administrative user account (e.g., presented through a GUI). In some instances where automated data mapping processing occurs through operation of a programmed software module, the trained AI processing 112 may be utilized to enhance determinations thereof and/or provide suggestions/recommendations for the administrative user account during data mapping processing. Implementation of AI including creation and management of data modeling is known to one skilled in the field of art. Above what is known, trained AI processing is specifically configured to generate data insights pertaining to the data ingestion and data provisioning of domain-specific data (e.g., education data). In doing so, exemplary AI processing 112, which is applicable to aid any type of determinative or predictive processing described herein, may be any of: supervised learning; unsupervised learning; semi-supervised learning; or reinforcement learning, among other examples. Non-limiting examples of supervised learning that may be applied comprise but are not limited to: nearest neighbor processing; naive bayes classification processing; decision trees; linear regression; support vector machines (SVM); and neural networks, among other examples. Non-limiting of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Non-limiting of semi-supervised learning that may be applied comprise but are not limited to: assumption determination processing; generative modeling; low-density separation processing and graph-based method processing, among other examples. Non-limiting of reinforcement learning that may be applied comprise but are not limited to: value-based processing; policy-based processing; and model-based processing, among other examples.

In any example, the artificial intelligence processing 112 may be configured to apply a ranker to determine a best possible result for outputting a determination related to any of: automated data mapping; data provisioning; and generation of recommendations/suggestions to aid data ingestion or data provisioning, among other examples. Implementation of ranking/scoring processing is known to one skilled in the field of art. Above what is traditionally known with respect to operation of ranking processing for AI processing 112, the AI processing 112 may be utilized to apply ranking/scoring to generated data analytics insights in order to generate a determination that may aid automated data mapping and/or data provisioning or any type of telemetric analysis. For instance, trained AI processing 112 may be configured to retrieved signal data and generate data analytics insights from collected signal data. Trained ranking processing may then be applied to analyze and curate the generated data analytics insights to generate said determinations.

Non-limiting examples of signal data that may be utilized for generation of data analytics insights comprise but are not limited to signal data pertaining to one or more of: usage of the administrative user account; a tenant configuration (e.g., synchronized education profiles) managed by an administrative user account; features/services provided through the educational platform service; and one or more software vendors (ISVs) associated with a tenant configuration or otherwise available for integration within the tenant configuration, among other types of signal data. Signal data may comprise any of user-specific signal data, device-specific signal data, application/service-specific signal data or a combination thereof. In some instances, signal data is obtained from accessing and parsing log data pertaining to usage of the distributed software platform 102 (including a specific feature/service provided by an ISV) by an administrative user account. Non-limiting examples of usage of an administrative user account comprise but are not limited to: signal data detected during real-time (or near real-time) usage of a software data platform (e.g., education platform service); device-specific data used for login to the administrative user account; user-specific signal data for usage of the administrative user account; usage data from interactions of the administrative user account with specific features, applications, services, etc.; preferences set for an administrative user account; past interactions with data mapping processing and/or data provisioning processing, and communications/messages received from/through one or more of vendors 108 and applications/services 110 of the distributed software platform 102, among other examples. Non-limiting examples of a tenant configuration (e.g., synchronized education profiles) associated with the administrative user account comprise but are not limited to: identification of specific features/services associated with a synchronized education profile including activated/de-activated features/services specific to a vendor 108 and/or an application/service 110 of the distributed software platform 102; device-specific data of users associated with a tenant 106 including device configurations during access to the distributed software platform 102; and identification of types of user accounts associated with a tenant 106, among other examples. Non-limiting examples of features/services provided through the educational platform service comprise but are not limited: usage, by user accounts associated with a tenant 106, of specific features/services provided through the distributed software platform 102 including activated/de-activated features/services; and new features/services provided by and/or accessible through the distributed software platform 102. Non-limiting examples of signal data pertaining to software vendors comprise but are not limited to: usage, by user accounts associated with a tenant 106, of specific features/services provided by vendors 108 (e.g., through the distributed software platform 102) including activated/de-activated vendor-specific features/services; and new features/services provided by vendors 108 and/or accessible through the distributed software platform 102.

In some cases, programmed rules may be applied by trained AI processing 112 that are used to determine how to prioritize collected signal data/generated data analytic insights to generate determinations aiding data mapping processing or data provisioning processing. Developers may set programmed rules specific to the types of processing operations being executed by the orchestration management component 104. For example, a rule may be applied that checks for specific types of signal data when other types of signal data are detected. In other technical instances, rules may be set that apply a weighting to specific types of signal data (or generated data analytics insights). This may be useful for generating determinations when the orchestration management component 104 is at a specific processing point. For instance, specific types of signal data may be evaluated when the orchestration management component 104 is determining whether to suggest a required/optional mapping designation and other types of signal data may be more useful when providing telemetric analytics pertaining to user account usage of features/services for data provisioning determinations, among other examples.

Moreover, during progression of data ingestion processing, an exemplary orchestration management component, via programmed software module and/or trained AI processing, may be configured to detect a timing for utilizing and/or surfacing specific data analytics insights or results of analysis of data analytics insights (e.g., determinations, recommendations, suggestions, autocorrections, telemetry reports). For instance, signal data pertaining to usage of the education platforms service by the administrative user account and/or signal data received regarding execution of features/services of the education platform service (e.g., automated execution of data mapping processing) may be analyzed to yield timing determinations as to when to utilize and/or present the data analytics insights. In some examples, determinations may be programmed to be automatically requested as specific processing progresses (e.g., automated data mapping processing is at a specific point) or when the administrative user account manually requests assistance. In further examples, signal data from other features/services and/or integrated applications/services (e.g., email/messaging application/service, collaborative/team-based application/service) may be triggers to utilize and present data analytics insights. Furthermore, ranking processing may be applied to filter timing options for utilizing data analytics insights to determine a best possible time to utilize a data analytic insight.

Additionally, the orchestration management component 104 may store education data including created data mappings on a distributed data storage. A non-limiting example of a distributed data storage is a distributed cache storage 114. The distributed cache storage 114 is configured to store application data (e.g., education data and associated data mappings) and web session data residing in database to enable access to and usage of the distributed software platform 102 including processing operations described herein related to data ingestion, data provisioning and usage of the distributed software platform 102 for SIS/LMS purposes, An exemplary distributed cache storage 114 may span multiple computing devices (e.g., servers) to accommodate larger transactional capacity if necessary. In some examples, the distributed cache storage 114 may be specific to a tenant 106, where the administrative user account may securely manage educational data specific to one or more institutions.

It is noted that education data is stored and retained in a manner that is commensurate with legal governance and compliance, which may include providing notice of usage of education data and obtaining consent to utilize education data in a specific manner (e.g., sharing data with thirdparties). A key differentiator of the distributed software platform 102 presented herein from other education service models is that the education institution, through the IT admin, has full control of their education data including sharing permissions for usage of the education data. In one non-limiting example, services connected with the distributed cache storage 114 allow the educational institution, through the administrative user account, to generate a copy of the institution education data (e.g., student roster data they have uploaded) directly from the distributed cache storage 114 with a selection of a GUI feature. This may include indication of mapped data educational fields for the distributed software platform 102. In further examples, the mapped education data may be read from the distributed cache storage 114 for generation of telemetry data for display to the administrative user account. In any case, facilitating direct access to mapped data allows an administrative user account to utilize data tools, provided through the distributed software platform 102, to build out reports (e.g., telemetry reports) based on their institution's needs. This also reinforces that the education data is their own data and not data of the distributed software platform 102. In some examples, the orchestration management component 104 may be configured to generate telemetry reports or other types of data analytics assessments automatically on behalf of an administrative user account. Such reports may be surfaced (e.g., automatically) for the administrative user account through the GUI or other software modality (e.g., email messaging, collaborative communication application/ service) to further aid management of education data. An exemplary GUI of the distributed software platform 102 may further be improved by including GUI elements/features that enable control storage of the education data through the distributed cache storage 114. For instance, a GUI may enable access to view data locally stored, or stored on a distributed storage to troubleshoot, search or filter in view (e.g., identify and filter data for specific synchronize data profiles).

During data ingestion processing, the orchestration management component 104 may further be configured to enable control of how and where education data and associated data mappings are stored (e.g., on the distributed cache storage 114). This may enable better control over education data when it comes to provisioning of the education data with vendors 108 and applications/services 110 including the setting of sharing permissions thereof. Further, education data of a specific type may be mapped in a single data mapping, stored on the distributed cache storage 114, whereby an administrative user account is able to bulk provision access to the education data (e.g., for vendors 108, applications/services 110 or other entities or purposes) using the single data mapping without having to create a plurality of associations to the data with each individual vendor 108, application/service 110, etc. For instance, specific types of education data may be identified in a data mapping (e.g., required educational data fields and optional educational data fields) and organized in hierarchical manner for ease of access and provisioning. This further provides an administrative user account with better control over their own education data.

FIG. 2 illustrates an exemplary method 200 for data ingestion including improved data mapping for integrating data into a software data platform, with which aspects of the present disclosure may be practiced. As an example, method 200 may be executed across an exemplary computing system 401 (or computing systems) as described in the description of FIG. 4. Exemplary components, described in method 200, may be hardware and/or software components, which are programmed to execute processing operations described herein. Non-limiting examples of components for operations of processing operations in method 200 are described in system diagram 100 (FIG. 1). Operations performed in method 200 may correspond to operations executed by a system and/or service that execute computer programs, software agents, application programming interfaces (APIs), plugins, AI processing including application of trained data models, intelligent bots, neural networks and/or machinelearning processing, among other examples. In one nonlimiting example, processing operations described in method 200 may be executed by a component such as an orchestration management component 104 (of FIG. 1). In distributed examples, processing operations described in method 200 may be implemented by one or more components connected over a distributed network.

Method 200 begins at processing operation 202, where a request to integrate data into a data profile (e.g., synchronized education profile) of a software data platform (e.g., education platform service) is received. As referenced in the foregoing description, an exemplary profile may be associated with a tenant configuration of a software data platform. In the example described in method 200, the software data platform is an education platform service, where a user account is an administrative user account that is managing education data associated with one or more educational institutions. An administrative user account may login (and authenticate) to the education platform service. Processing for validation of login and authentication of the administrative user account is known to one skilled in the field of art. Through a GUI of the education platform service, the administrative user account may request (processing operation 202) to integrate file data into a data profile of the education platform service to initiate data mapping processing. This may occur through one or more selections of GUI elements presented through a GUI of the education platform service. For instance, the administrative user account may provide a selection of specific data file (or data files) intending to integrate data of the data file into the education platform service. As referenced in the foregoing description, data may be education data associated with one or more educational institutions. An exemplary GUI may be improved over traditional GUIs for administrative control of education data making it much easier for an administrative user account (e.g., IT admin) to integrate data into a software platform. Non-limiting examples of an exemplary GUI are illustrated in FIGS. 3A-3I.

Flow of method 200 may proceed to processing operation 204, where data analytics insights may be generated to aid data ingestion processing. In some instances, data analytics insights may be generated in real-time (or near real-time). For instance, this may occur based on evaluation of signal data pertaining to usage of the administrative user account, where access to specific features/services may be a trigger to generate data analytics insights. In one example, receipt of a data ingestion request may be a trigger for initiating back-end processing to generate data analytics insights (e.g., receipt of the request in processing operation 202). This may subsequently aid the education platform service in guiding an administrative user account through steps of data mapping processing. In alternative examples, data analytics insights may be generated at a point in time where the administrative user account is offline (logged off) from the educational platform service. As such, method 200 may not require explicit generation of data analytics insights and may only require retrieval thereof.

As an example, the data analytics insights are generated by application of trained AI processing as referenced in the foregoing description. For instance, data analytics insights may be generated for any aspect of data ingestion processing, data provisioning processing and/or telemetric analysis of a tenant account (including usage of applications/services provided through an education platform service by specific users). Trained AI processing may be applied to generate the data analytics insights by analyzing signal data. As referenced in the foregoing description, non-limiting examples of signal data comprise but are not limited to signal data indicating one or more of: usage of the administrative user account; a tenant configuration (e.g., synchronized education profiles) associated with the administrative user account; features/services provided through the educational platform service; and one or more software vendors associated with a tenant configuration or otherwise available for integration within the tenant configuration, among other types of signal data. With respect to data ingestion, trained AI processing may correlate signal data with specific steps in data ingestion processing (e.g., throughout data mapping processing) to generate insights to guide the administrative user account through the data mapping process. For instance, signal data detected from real-time (or near real-time) actions of the administrative user account may be utilized to generate relevant data analytics insights and subsequent determinations generated from data analytics insights. As previously described, application of trained AI processing may further utilize data analytics insights to generate determinations that may aid automated data mapping and/or data provisioning or any type of telemetric analysis. Processing operation 204 may further comprise automatically generating said determinations, which may be manifested as any of suggestions, recommendations, autocorrections, telemetry reports, etc.

During progression of data ingestion processing, an exemplary orchestration management component, via programmed software module and/or trained AI processing, may be configured to detect a timing for utilizing and/or surfacing specific data analytics insights or results of analysis of data analytics insights (e.g., determinations, recommendations, suggestions, autocorrections, telemetry reports). For instance, signal data pertaining to usage of the education platforms service by the administrative user account and/or signal data received regarding execution of features/services of the education platform service (e.g., automated execution of data mapping processing) may be analyzed to yield timing determinations as to when to utilize and/or present the data analytics insights. In some examples, determinations may be programmed to be automatically requested as specific processing (e.g., data mapping processing progresses) or when the administrative user account requests assistance. In further examples, signal data from other features/services and/or integrated applications/services (e.g., email/messaging application/service, collaborative/team-based application/service) may be triggers to utilize and present data analytics insights. Furthermore, ranking processing may be applied to filter timing options for utilizing data analytics insights to determine a best possible time to utilize and/or present a data analytic insight. It is noted that processing to generate and analyze data analytics insights may be continuous and reflect a current context in which the educational platform service is executing and user interaction therewith.

At processing operation 206, data analytics insights for the profile may be retrieved through the education platform service. Retrieval (processing operation 206) of data analytics insights may comprise one or more of: identifying, parsing and filtering specific data analytics insights. In one example, data analytics insights may be curated/filtered based on a timing identified for utilization of data analytics insights (e.g., based on user interaction with the education platform service for data ingestion processing). Furthermore, processing operation 206 may further comprise identifying applicable results of analysis of data analytics insights (e.g., determinations, recommendations, suggestions, autocorrections, telemetry reports), which may further improve processing efficiency (and a user experience through the GUI).

Continuing with method 200, in response to receiving the request to integrate data, a component of the software data platform automatically executes (processing operation 208) data mapping processing. In one example, automated execution (processing operation 208) of data mapping processing may be pre-programmed to occur through execution of an orchestration management that may run concurrently (or integrated within) the education platform service. In further instances, automated execution (processing operation 208) of data mapping processing may utilize the data analytics insights (and results of analysis thereof) to generate a data mapping for integration of the data into the profile of the education platform service. In an educational example, the data mapping processing maps the data of the data file to educational data fields associated with the data profile (e.g., synchronized education profile) being managed by the administrative user account. This enables the education data to be integrated into features/services of the education platform service including features/services provided by ISVs integrating therein.

Automatic execution (processing operation 208) of the data mapping processing aids the administrative user account with importation of their education data into the education platform service. Essentially, processing operation 208 comprises presentation of a wizard-like GUI that guides the administrative user account through processing that needs to occur to map its education data into the education platform service. Data mapping processing may factor in a current tenant configuration including relationships with vendors (ISVs) as well as inform the administrative user account of optional configurations that may be implemented for future extensibility of the education platform service. Depending on the features/services that the administrative user account wishes to activate in the future, optional educational data fields may need to be mapped, which the administrative user account may not be aware of normally when integrating its education data. The automatic data mapping processing may help organize an institutions education data into buckets (e.g., required educational data fields, optional educational data fields) so that the administrative user account has complete control over feature/service control using a single data mapping. This greatly improves processing efficiency by acquiring data (and mapping the data) once and using that mapping to integrate with many different vendors (ISVs) and/or applications/services. In other technical instances, the breadth of application of data that is provisioned can be easily modified at any time without requiring re-mapping of data. However, data mapping processing can also be created/modified at any time through the automatic data mapping processing. Throughout the data mapping processing, the orchestration management component may be configured to monitor reference points and interactions and present to the user auto suggestions to further reduce onboarding abandonment or feelings of being overwhelmed with the process. This may further help prevent or reduce manual errors while increasing confidence in the automatic processing.

During execution, processing operation 208 may comprise identifying data needed from an educational institution to enable features/services of the education platform service. This may comprise identification of data files that store specific types of education/educational data including but not limited to: organizations, academic sessions including identification of calendared school year, courses, classes, users, enrollments, extracurricular activities, among other non-limiting examples. An exemplary GUI may direct to an administrative user account to identify the type of education data being imported and how they would like to import the data (e.g., file type, format). Such GUI selections may impact how the data mapping processing progresses and the validation checks that may be performed on the data. For instance, a specific type of education data (e.g., rostering) may be mapped for integration into the education platform service. The administrative user account may then identify how the data will be read (e.g., location on local/distributed storage) and the format for import of a data file (e.g., file identifying comma-separated values (CSV) or API).

Through the data mapping processing, an exemplary GUI enables access to view education data locally stored in cache or distributed storage managed by the admin, troubleshoot, search or filter in view (e.g., identify and filter data for specific synchronized education profiles). The data mapping processing attempts to automatically correlate identified education data with specific data field mappings of the education platform service. GUI features may further be provided through the GUI to control features related to educational data fields, update of data mappings, etc. For instance, non-limiting examples of GUI features/elements may provide options including but not limited to: review listings of existing mapping fields; update field mappings; raise warnings, acknowledge messages, make notes/comments; filter data mappings based on data profiles; execute run scheduled synchronization or manual synchronizations; manage credentials including types of connectors associated with systems; view logs of user activity; view telemetry for data mapping processing, usage of education platform service by users of profiles (tenant configurations) and links to support, among other examples.

Furthermore, trained AI processing may be configured to automate the data mapping process on behalf of the administrative user account. This may comprise generation of data analytics insights to aid with data mapping processing. In some examples, data analytics insights (and recommendations therefrom) may be presented to the administrative user during the validation check. In at least one instance, automated execution of the mapping processing comprises determining required educational data fields that pertain to a current configuration of the synchronized education profile relative to one or more of: services of the education platform service and services associated with the one or more software vendors. In further instances, automated execution of the mapping processing comprises determining optional educational data fields that, if activated, would enhance a user experience for users associated with the synchronized education profile relative to one or more of: the services of the education platform service and the services associated with the one or more software vendors. When the validation check is presented to the administrative user, the GUI may be configured to disambiguate the required educational data fields from the optional data fields. This enables an administrative user to more clearly understand how their data is being used and how to provision the data when it comes to integration with ISVs and features of the educational platform service.

Execution (processing operation 208) of data mapping processing may further comprise validation of a data mapping of educational data to educational data fields associated with the education platform service. Validation may occur on different aspects of data/educational data fields (e.g., do I have all the files I am looking for based on the format and configuration?). In doing, so education data (and associated metadata) for ingestion may be identified, parsed and analyzed. This may begin with evaluation of header data associated with a portion of a data file to identify the specific data that is being evaluated for ingestion. In one example, a row by row validation occurs of the data to correlate a specific portion of education data with an educational data field of the education platform service. In cases where header information is not identified to properly parse data for records, a validation error may be identified. If the headers can be correlated, the data mapping processing may proceed.

Validation checks may also be performed on the actual data that is being ingested. Validation checks may be pre-programmed by developers with respect to the type of data that is being mapped. For instance, non-limiting examples of validation checks may evaluate associations/references between the education data and an institution providing the education data including but not limited to: are users such as students teacher properly associated with an educational institutions?; is a school/educational institution valid?; are students associated with a specific grade/class, district, etc., among other examples. Further validation checks may occur on the breakdown of data in the file. For example, if the data file identifies a specific type of file (e.g., student rostering) then does the data file identify specifics such as: grade; class; age; teacher designation, etc., among other examples. Validation errors may be raised on any aspect of the data mapping processing. In some cases, validation errors may simply be raised to confirm a specific aspect of the data mapping with the administrative user account (e.g., to help identify features/services which may provide a richer experience of users of the education platform service). As the data analytics insights are further configured to aid the administrative user account during data ingestion processing, the automatically executing of the data mapping processing further generates one or more recommendations, based on the data analytics insights, that are configured to assist the administrative user account with validation of the data mapping.

As a result of execution of a validation check, flow of method 200 may proceed to processing operation 210. At processing operation 210, it is determined if any validation errors are identified from the data mapping processing. A validation check of the data mapping may be presented (processing operation 212) to the administrative user account through the GUI of the education platform service.

Processing operation 212 may comprise presenting validation errors or review of mapping fields for user confirmation. In a non-limiting example, presentation of the validation check comprises surfacing, through the GUI, one or more recommendations for the data mapping that are generated from the data analytics insights. If validation errors occur, the validation check may further present validation errors and insights and/or autocorrections to aid remediation. As referenced above, in some examples, data mapping processing may result in determination of data mapping errors when mapping data of a data file to educational fields for usage through the education platform service. Presentation of a validation check may comprise presenting, through a GUI, identification of any data mapping errors to aid resolution of the data mapping error by the administrative user account. In at least one example, determination of a data mapping error may comprise utilizing the data analytics insights to recommend an input value for one or more of the educational data fields associated with the data mapping error, where a recommendation for the input value is provided in the validation check to aid resolution of the data mapping error. In essence, this provides a suggested data transformation to aid data mapping on behalf of the administrative user account before the user has to intervene. In some technical instances, a recommendation for an input value may be a curated listing of input values that may be most applicable to a specific educational data field in an education platform service. For instance, a small list of specific types of input values may be curated as a suggested data transformation from a large listing of applicable input values. This listing may be presented for confirmation by the administrative user account as a novel type of data transformation suggestion so that the admin is not overwhelmed with a large amount of data mapping possibilities.

In other examples, determination of a data mapping error may comprise utilizing the data analytics insights to generate an autocorrection of the data mapping error. Presentation (processing operation 212) of a validation check may comprise presenting a GUI element identifying the autocorrection of the data mapping error for the administrative user account. In further examples, specific data analytics insights may be provided through a GUI. In the example where an autocorrection is applied, a data analytics insight may identify the administrative user a rationale as to why the autocorrection was automatically applied. An exemplary rationale may have a basis on a collective analysis of one or more of: the synchronized education profiles associated with the administrative user account; the features/services provided through the educational platform service and the signal data pertaining to one or more software vendors, among other examples.

Flow of method 200 may proceed to processing operation 214. At processing operation 214, a confirmation is received of a data mapping of the education data to the educational data fields of the education platform service. In some instances, the administrative user account may provide confirmation of the data mapping when they believe that the data has been properly mapped. This does not necessarily mean that all data mapping errors have been resolved. In other cases, the confirmation may be received after all validation errors have been resolved. As such, flow of method 200 may proceed to decision operation 216, where it is determined if validation errors have been resolved. In cases where validation errors are not resolved, the data mapping processing may direct the administrative user account to resolve the data mapping errors (through the GUI) before proceeding. If data mapping errors remain (i.e., have not been resolved), flow of decision operation 216 branches NO and processing of method 200 returns to processing operation 212. At processing operation 212, an updated data mapping validation is presented to the administrative user account through the GUI. This provides the administrative user account with the opportunity to resolve outstanding data mapping errors. In technical instances where all data mapping errors are resolved, flow of decision operation 216 branches YES, and processing of method 200 proceeds to processing operation 218.

At processing operation 218, the data mapping is stored for the administrative user account. As referenced in the foregoing description, storage (processing operation 218) of the data mapping may result in the data mapping being stored on a distributed cache storage associated with the education platform service. The distributed cache storage may be specific to a tenant configuration (e.g., one or more synchronized education profiles), which may be exclusively controlled by the administrative user account.

Flow of method 200 may proceed to processing operation 220. At processing operation 220, the data mapping may be integrated with one or more data profiles of the education platform service. Processing operation 220 may comprise automated processing that activates/de-activates features/services based on the stored data mapping. In some alternative examples, the data mapping may be enabled to be integrated with other application/services outside of a specific education platform service. In such technical instances, processing may be similar where the data mapping may be used to provide access to features/services of other applications/services. In alternative examples, a GUI may further be modified to enable integration of generated data mapping with other applications/services, which may include data transformations of specific educational data fields that were mapped for a different purpose.

At processing operation 222, access to the data mapping may be provided to the administrative user account through the GUI of the education platform service. This may occur to provide the administrative user account with the ability to utilize the data mapping for a specific purpose (e.g., retrieve telemetric reports) or otherwise modify/update the data mapping. In cases where the administrative user account modifies/updates a stored data mapping, the changes may be automatically reflected and propagated for application through the education platform service including to vendors (ISVs) providing features/services through the education platform service.

FIGS. 3A-3I illustrate non-limiting examples of processing device views of a device that is enabling a user to manage data ingestion processing through a GUI, with which aspects of the present disclosure may be practiced.

FIGS. 3A-3I provide non-limiting front-end examples of processing described in the foregoing including system diagram 100 (FIG. 1) and method 200 (FIG. 2).

Figure 3A:
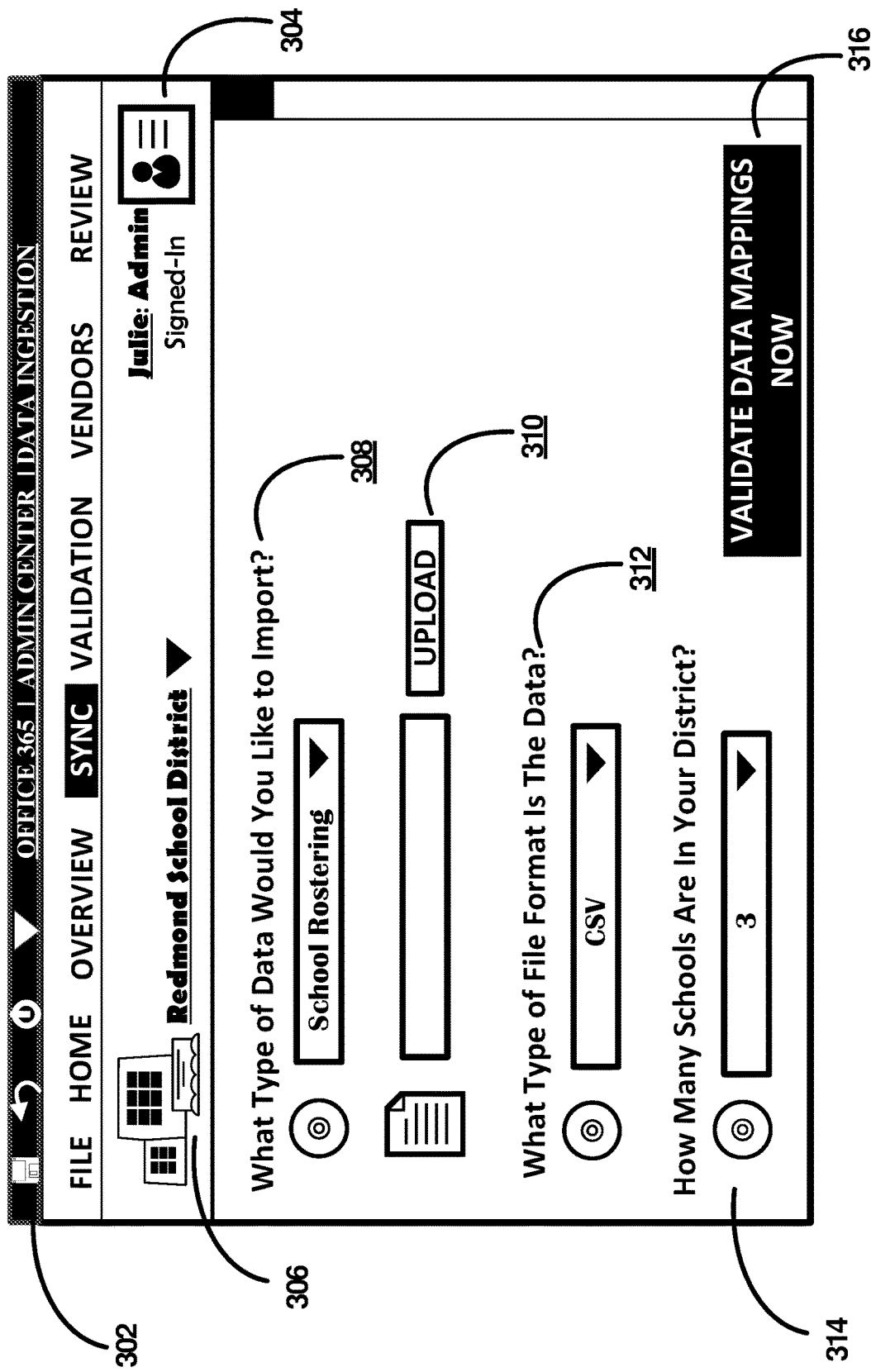
FIGS. 3A-3I illustrate non-limiting examples of processing device views of a device that is enabling a user to manage data ingestion processing through a GUI, with which aspects of the present disclosure may be practiced.

FIG. 3A presents processing device view 300, illustrating an exemplary GUI 302 for an education platform service. As shown in processing device view 300, the GUI 302 may be configured to present specific GUI features/elements pertaining to the novel processing operations described in the present disclosure, wherein the GUI is specifically configured to aid a user with data ingestion of data into the education platform service. In processing device view 300, a login feature 304 is displayed in the GUI identifying that an administrative user ("Julie") is logged in and accessing the GUI 302 to integrate education data into the education platform service. The GUI may further identify a profile feature 306 identifying a specific data profile (e.g., synchronized education profile) for which a data mapping may be created for and applied to. In the example shown in processing device view 300, a data mapping is being created for an educational institution ("Redmond School District") as shown in profile feature 306. Profile feature 306 may enable the administrative user account to easily change the data profile that they are working with. This may be useful in technical instances where an administrative user account manages numerous educational institutions and thus has more than one data profile registered with the education platform service.

The GUI 302 is configured to provide, for the administrative user account, numerous GUI feature fields 308-314, enabling the administrative user account to provide specific intel regarding the education data they are integrating for data mapping. For instance, an import type GUI feature 308 is configured to enable the administrative user account to identify the type of education data they would like to map. An upload GUI feature 310 is configured to enable the administrative user account to select a data file (or multiple data files) that the education data is to be mapped from. A data type GUI feature 312 is configured to enable the administrative user account to select the format of data file/integration method (e.g., CSV or API) that the education data is to be mapped from. Furthermore, additional GUI features may provide specifics regarding educational institutions associated with a data profile, whereby the administrative user account can provide additional information to make it easier for an orchestration management component to identify the breakdown of the education data that is being worked with. A non-limiting example of such data is shown in GUI feature 314, where the admin can disambiguate how many schools are in a school district (associated with a selected data profile).

Once the administrative user has provided sufficient data to identify the education data that they wish to integrate for data mapping, a request for initiation of data mapping processing may be provided through selection of a data mapping validation feature 316 that is presented in the GUI. This may trigger the back-end processing by an orchestration management component or the like to execute data mapping processing described in the foregoing description.

Figure 3B:
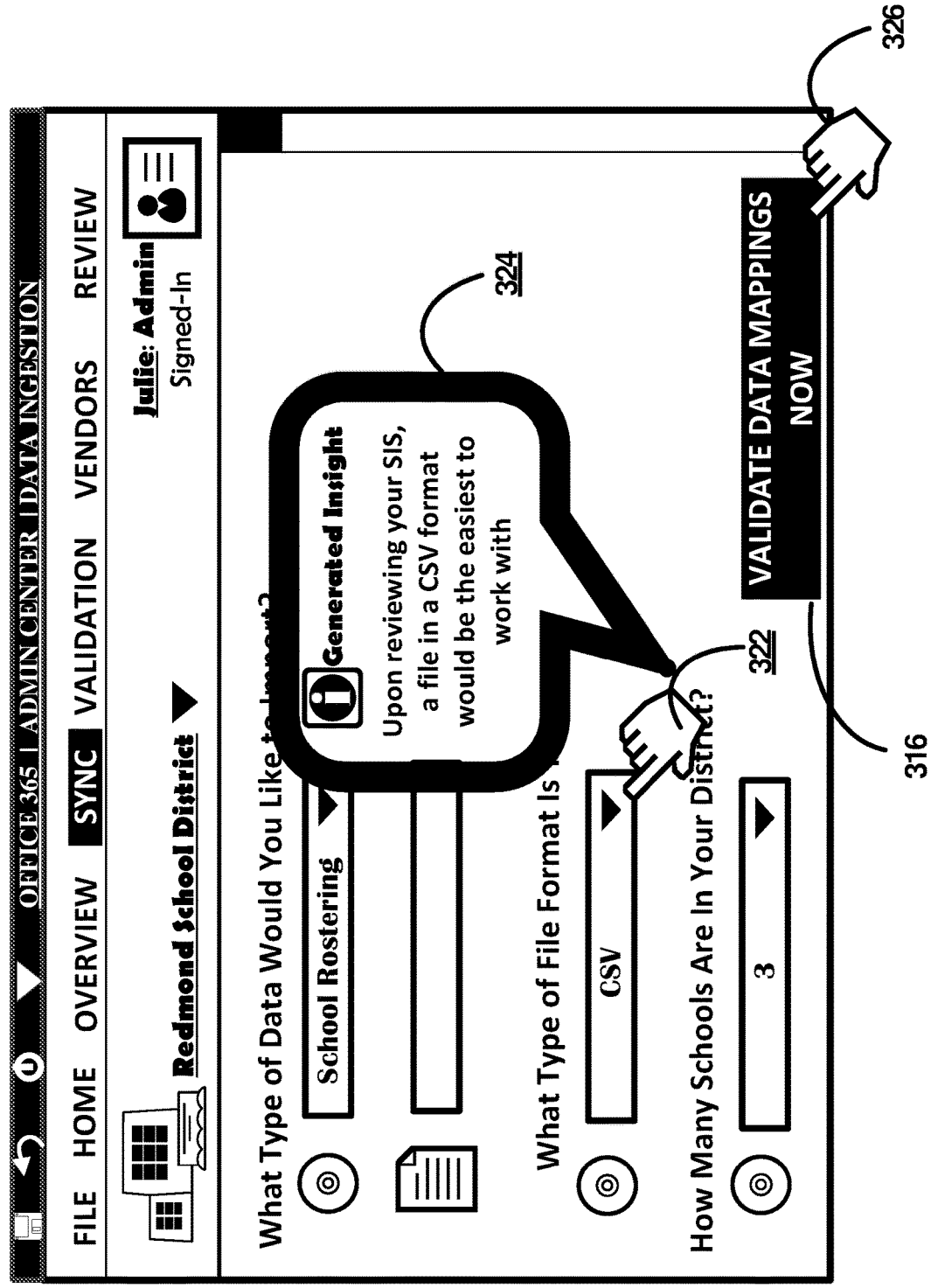

FIG. 3B presents processing device view 320, illustrating a continued example of an exemplary GUI 302 for an education platform service building off what is shown in processing device view 300 (FIG. 3A). Processing device view 320 illustrates that the administrative user account has provided a GUI selection 322 in the data type GUI feature 312 (shown in FIG. 3A), identifying that the education data in a data file is in a CSV format. The GUI selection 322 may aid the orchestration management component with executing the data mapping processing. As referenced in the foregoing description, data analytics insights may be generated and presented through a GUI at any point during the data mapping processing. Processing device view 320 illustrates a non-limiting technical example where a data analytic insight 324 is automatically provided through the GUI 302 in response to receipt of the selection 322. The data analytic insight 324 provides an indication that results from correlating a current tenant configuration with the selection 322 of the data type. This may provide the administrative user account with assurances that they are making a proper selection and further ease their concerns that a large number of data mapping errors may arise.

Moreover, processing device view 320 shows that a user executes a selection 326 of a data mapping validation feature 316 presented through the GUI. Selection 326 is a trigger to initiate creation and validation of a data mapping that maps education data to educational data fields of the education platform service. This may trigger advancement in the GUI as shown in FIG. 3C.

Figure 3C:
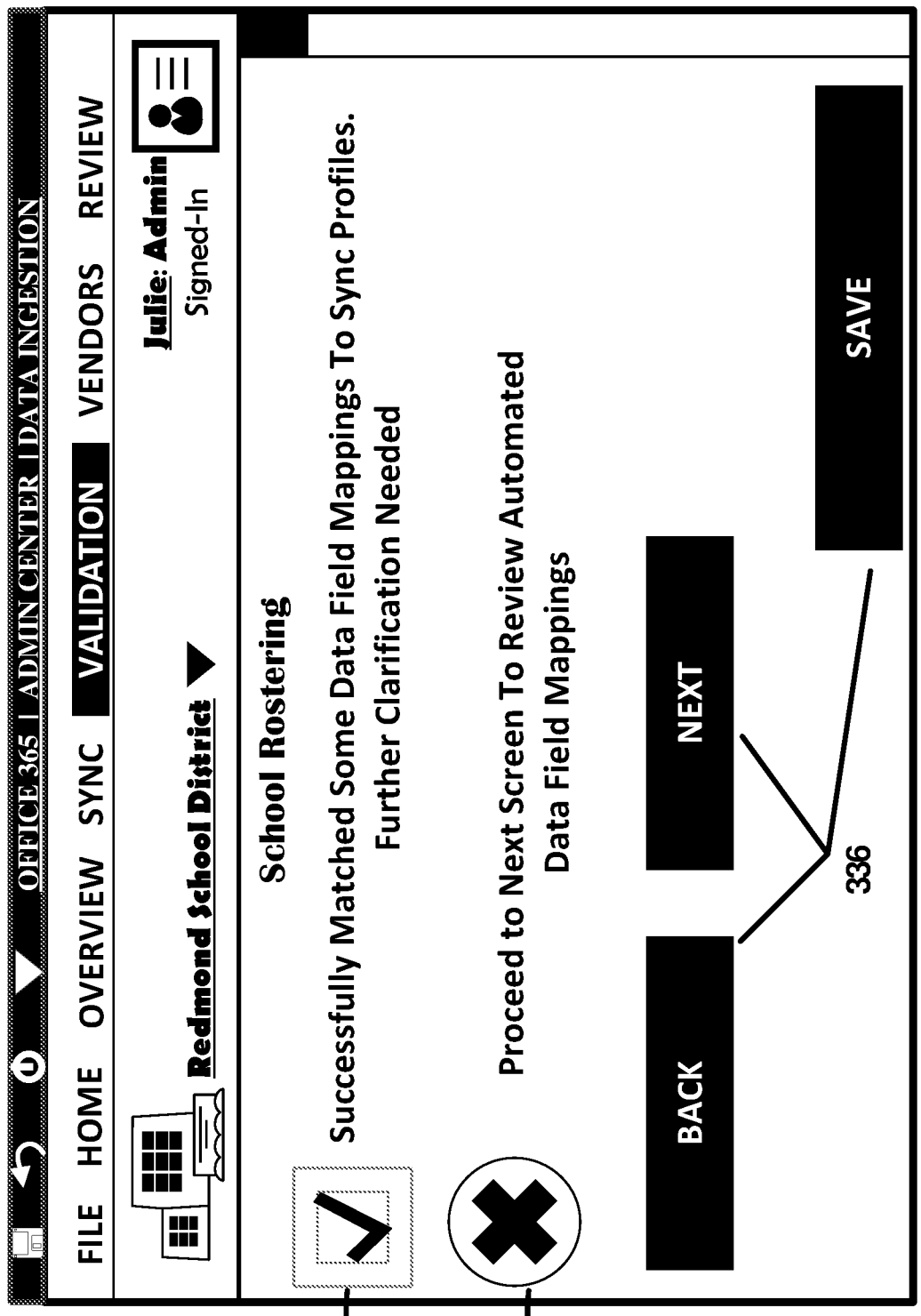

FIG. 3C presents processing device view 330, illustrating a continued example of an exemplary GUI 302 for an education platform service building off what is shown in processing device view 320 (FIG. 3B). Processing device view 330 illustrates a non-limiting example providing notifications of a result of an initial instance of data mapping processing. In the example shown, data mapping processing is occurring to integrate education data related to school rostering into data fields of the education platform service for a specific data profile ("Redmond School District"). A first GUI notification 332 identifies, through the GUI, that the data mapping processing yielded mostly successful results (with further clarification needed). A second GUI notification 334 identifies, through the GUI, that the administrative user account will be directed to review the data mapping result (on a next GUI screen). Furthermore, GUI control FIG. 336 are presented that may help an administrative user account navigate data mapping processing. Non-limiting examples of such control FIG. 336 comprise but are not limited to: a control feature to return to a previous GUI screen; a control feature to proceed to a next GUI screen; and a control feature to save progress made through the data mapping processing.

Figure 3D:
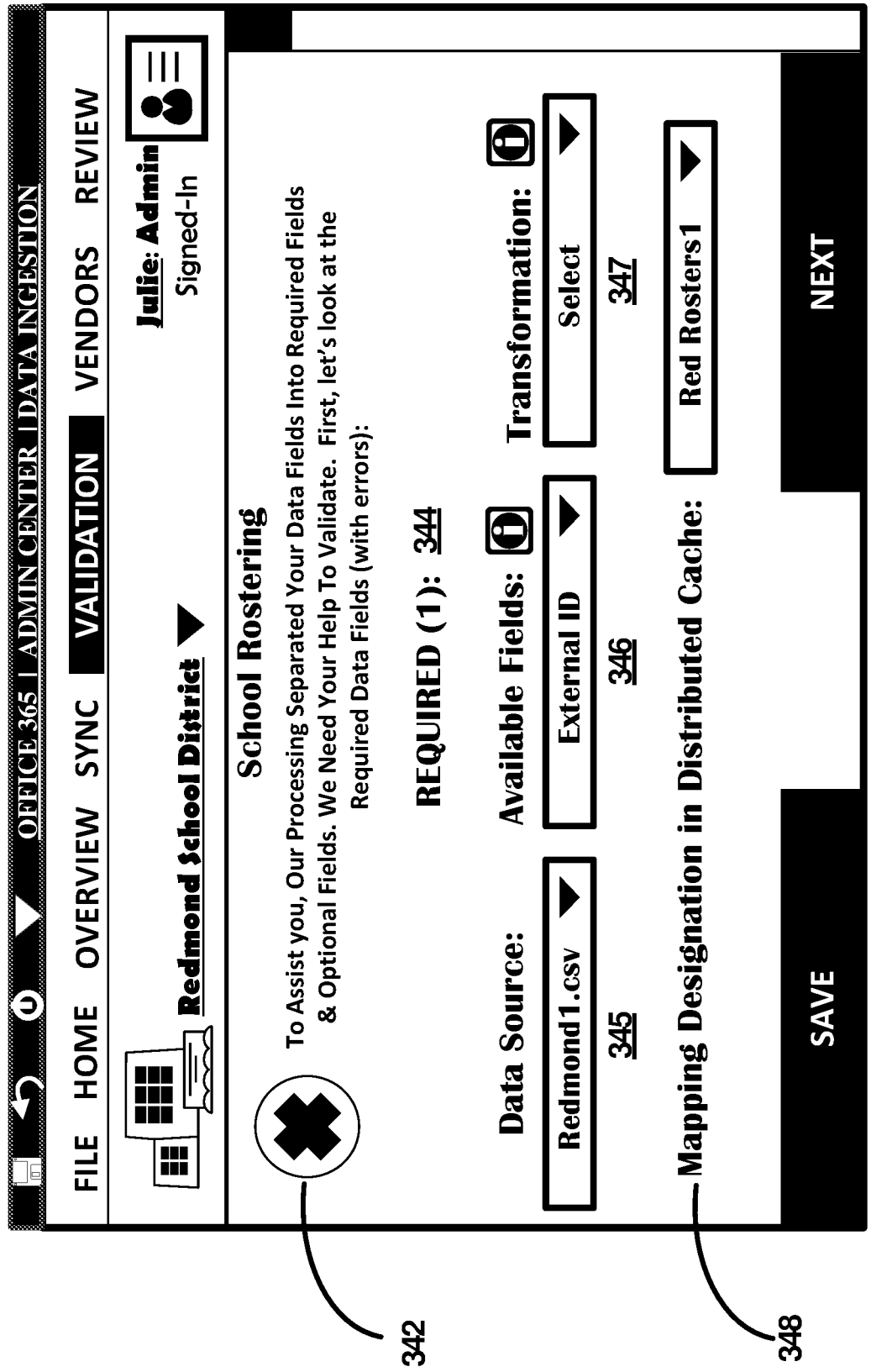

FIG. 3D presents processing device view 340, illustrating a continued example of an exemplary GUI 302 for an education platform service building off what is shown in processing device view 330 (FIG. 3C). In a continued example, a user may have progressed to a next GUI screen (from that shown in FIG. 3C) to review a result of automated data mapping processing. A data analytic insight 342 is generated and presented through the GUI providing the administrative user account with insights into how education data was mapped to education data fields of the education platform service. For example, based on tenant configuration, some education data from a data file was mapped to required educational data fields 344, as identified in the GUI. Other education data was mapped to optional education data fields (shown in FIG. 3E). Specific data inputs 345-348 for the required educational data fields 344 are shown in processing device view 340. In the example shown in processing device 340, some portions of the required educational data fields have been automatically completed for the user based on previous user GUI selections and/or a result of the automated data mapping processing. For instance, data input fields 345 and 346 have been automatically populated for the administrative user account based on the automated data mapping processing. Data input field 347 requires user input to disambiguate how the data is to be read from the data file to correlate with an educational data mapping field of the education platform service. Data input field 348 provides the administrative user account with the ability to select how a data mapping may be stored in a distributed cache storage associated with the education platform service.

Figure 3E:
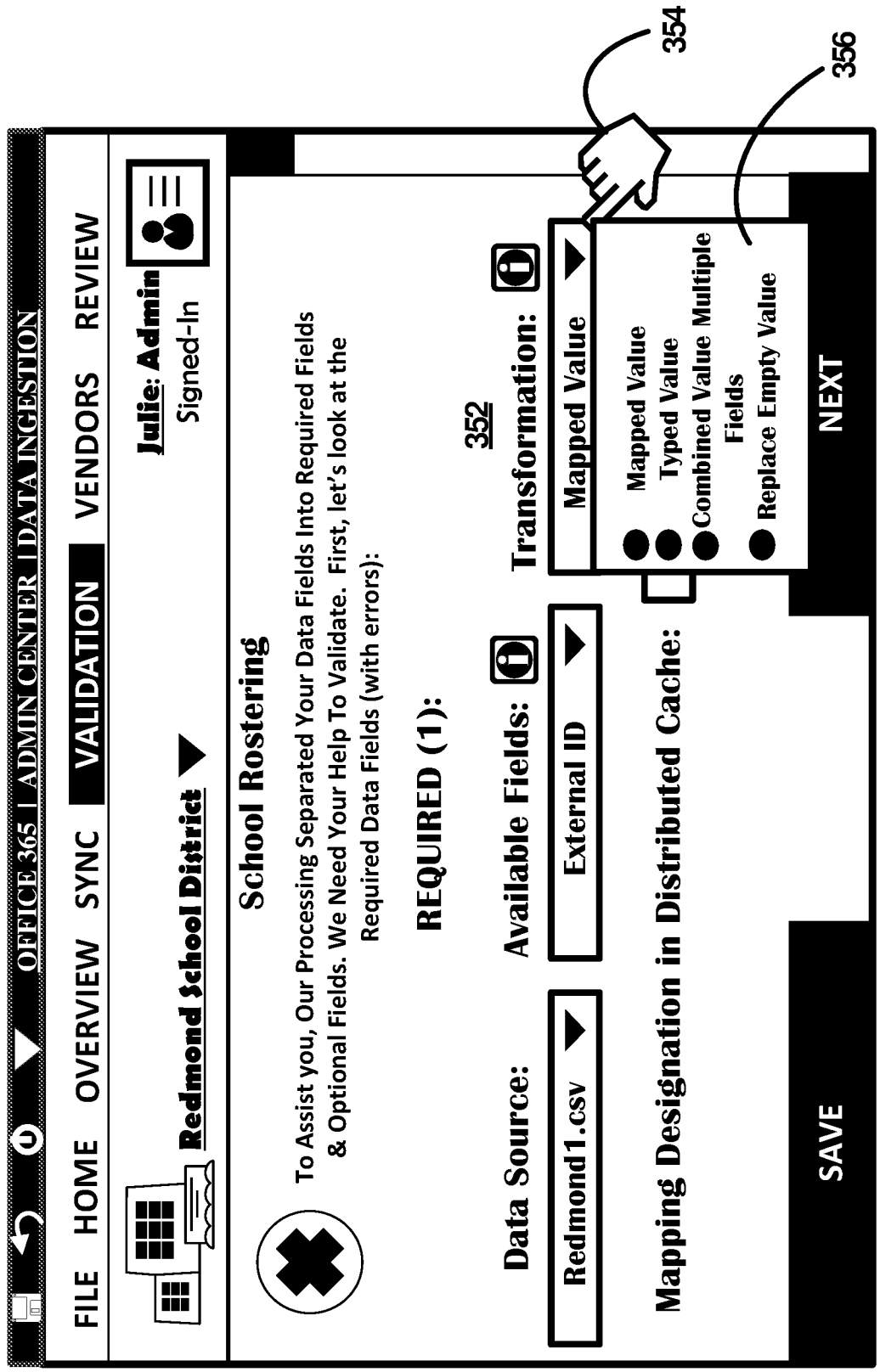

FIG. 3E presents processing device view 350, illustrating a continued example of an exemplary GUI 302 for an education platform service building off what is shown in processing device view 340 (FIG. 3D). In a continued example, a user may provide a selection 352 into data input field 347 (shown in FIG. 3D), identifying that a data transformation of "External ID" read from a data file (e.g., identified in data input field 346 of FIG. 3D) should be read as a "mapped value." This may occur for mapping that data field in the data file to the educational data field of the education platform service. In the example shown in processing device view 350, data transformations suggestions 356 may be provided for the user, for example, based on a GUI selection 354 of the data input field 347. As referenced in the foregoing description, the data transformation suggestions 356 may comprise a curated listing of input value options (4 different options shown) from all possible input value options (more than the 4 options displayed). This may help avoid confusion for the administrative user account by eliminating unnecessary options as well as improving processing efficiency by minimizing the processing time required to achieve a correct data mapping.

Figure 3F:
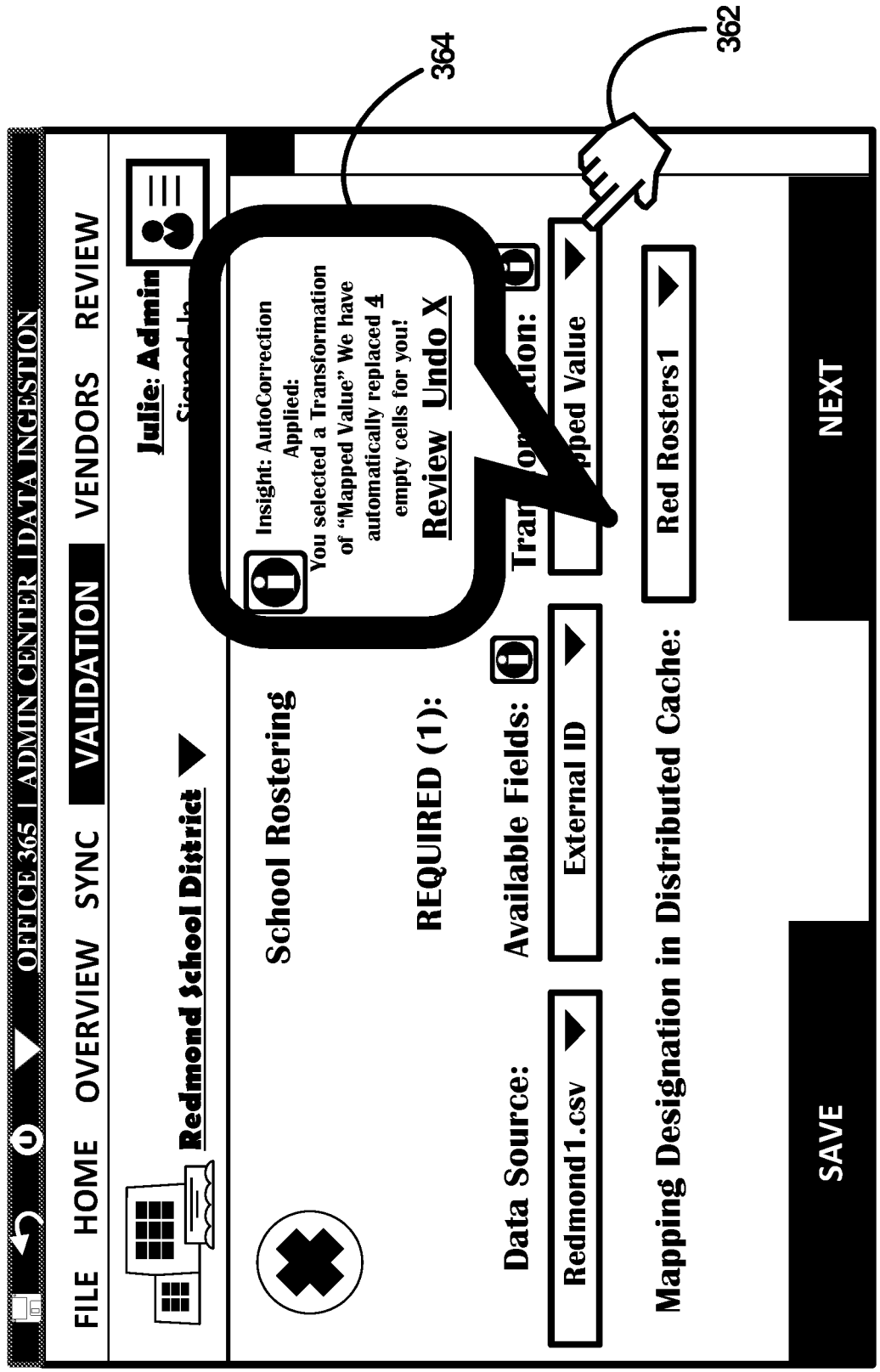

FIG. 3F presents processing device view 360, illustrating a continued example of an exemplary GUI 302 for an education platform service building off what is shown in processing device view 350 (FIG. 3E). In a continued example, a selection 362 of an input value for the data input field 347 (shown in FIG. 3D) results in the automatic presentation of a data analytic insight 364. The data analytic insight 364 indicates that autocorrection processing has occurred on behalf of the administrative user account (e.g., without user interaction) to correct potential data mapping errors that may have resulted from the selection 362 made by the user. Since the data analytic insight 364 is a notification of an autocorrection applied without user request, the data analytic insight 364 may further provide a GUI feature that enables a quick "UNDO" of the autocorrection that was automatically applied. This gives the administrative user account the option to manually resolve data mapping errors if so desired.

Figure 3G:
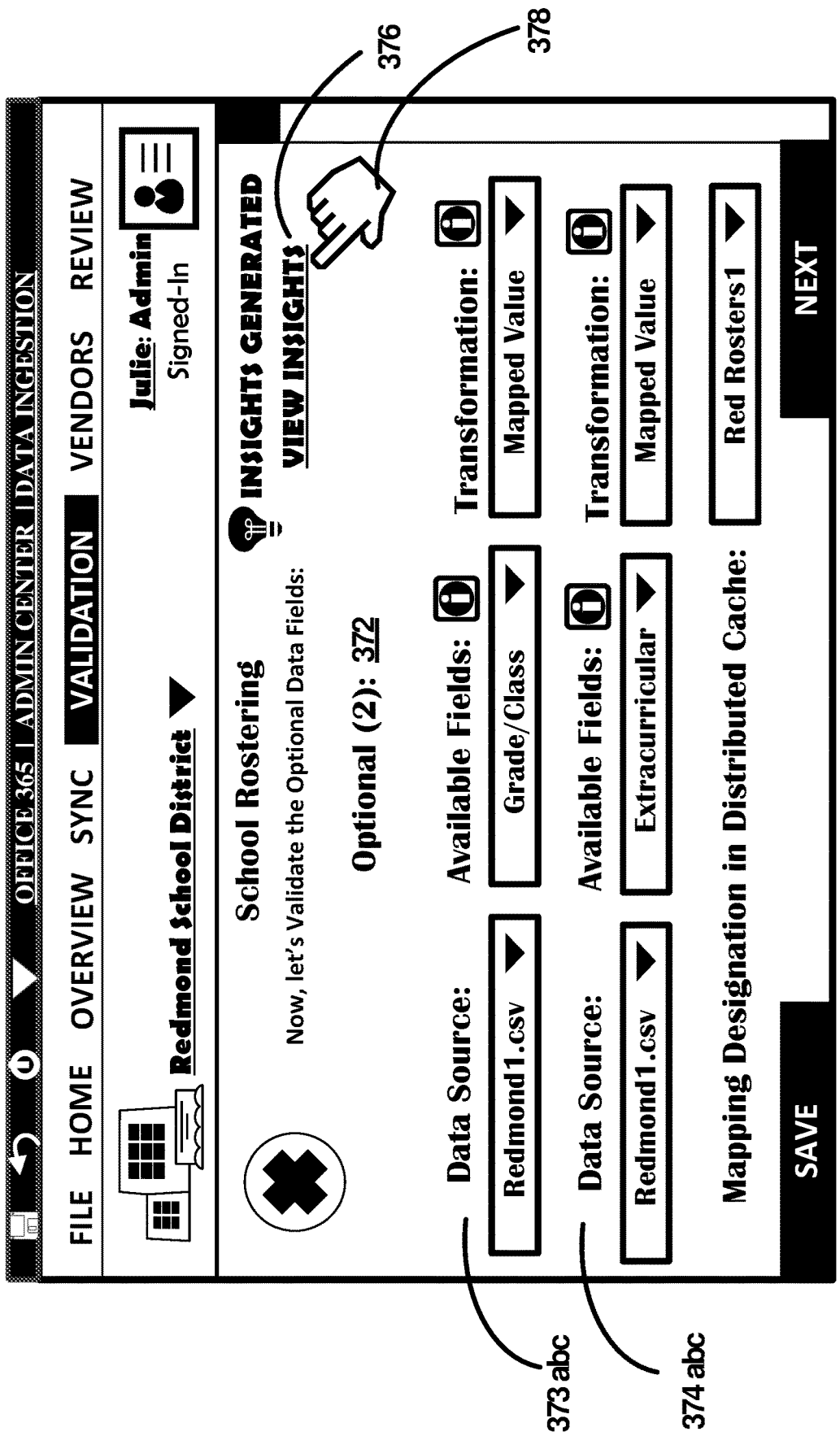

FIG. 3G presents processing device view 370, illustrating a continued example of an exemplary GUI 302 for an education platform service building off what is shown in processing device view 360 (FIG. 3F). In a continued example, a user may have progressed to a next GUI screen (from that shown in FIG. 3F) to review a result of automated data mapping processing specifically data mapping for optional educational data fields 372. Specific data inputs 373abc and 374abc are provided for different optional educational data fields 372 that the user can choose whether to include in a data mapping. The optional educational data fields 372 may not be required to implement features/services based on a current tenant configuration but, when activated/enabled, may be included in a data mapping to enable future tenant configurations that may utilize additional features/services. In the example shown in processing device view 370, specific optional educational data fields include "Grade/Class" and "Extracurricular," whereby education data found in a data file would map to those respective optional education data fields so that features/services can utilize the education data to provide a richer user experience.

Moreover, as the administrative user account may be unfamiliar with the educational data fields of the education platform service, data analytics insights may be provided to aid the user with data mapping. A data analytics insight link 376 is presented int the GUI that, when selected, would provide the user with intel to potentially aid decision-making. Processing device view 370 further shows a selection 378 of the data analytics insight link 376 resulting in an update to the GUI (shown in FIG. 3H).

Figure 3H:
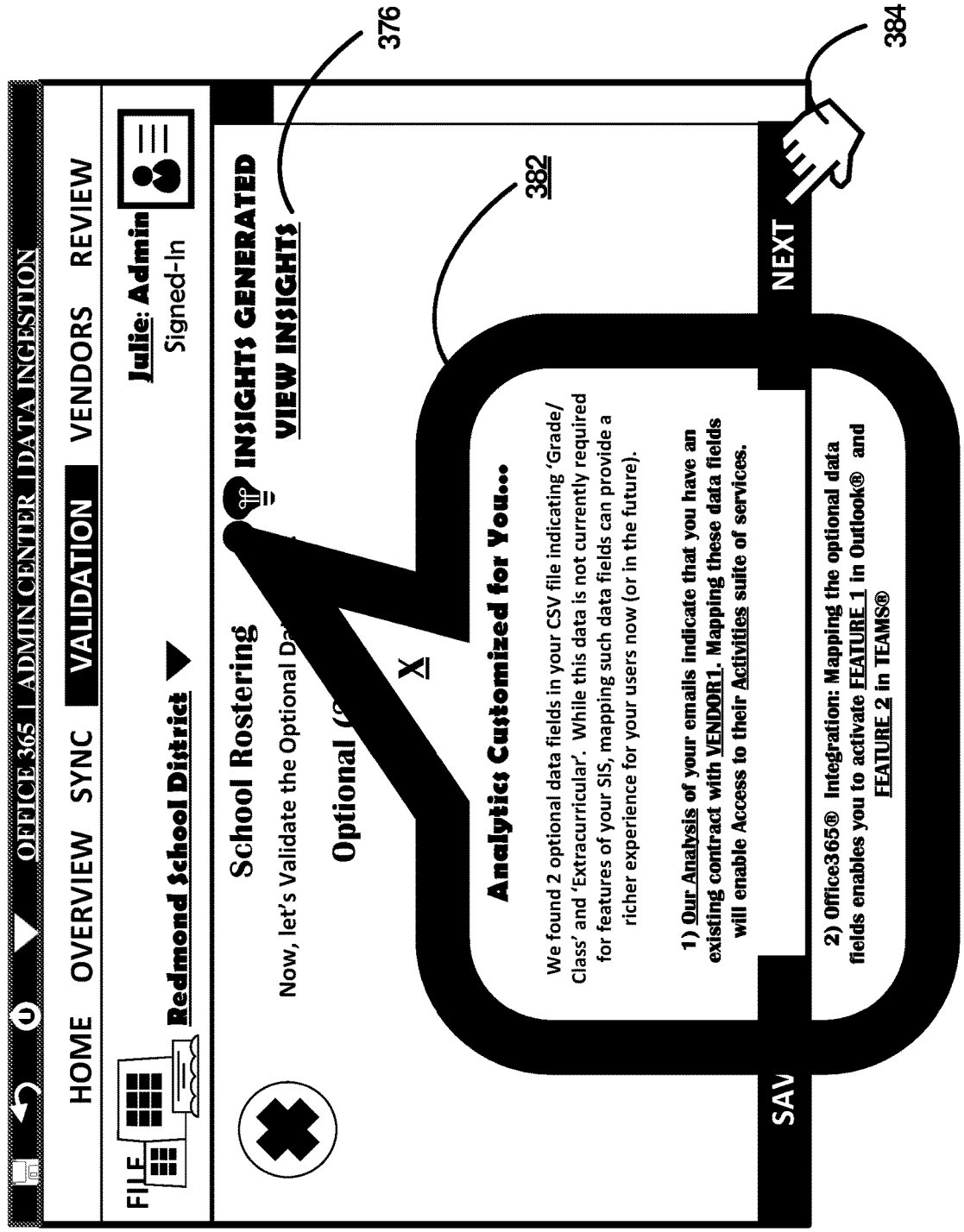

FIG. 3H presents processing device view 380, illustrating a continued example of an exemplary GUI 302 for an education platform service building off what is shown in processing device view 370 (FIG. 3G). In response to the selection 378 of the data analytics insight link 376 (shown in FIG. 3G), a recommendation 382 is provided reflecting a result of processing data analytics insights. The recommendation 382 identifies how mapping the optional educational data fields can provide a richer user experience including integration of: 1) features/services provided by a specific vendor (e.g., ISV identified as "VENDOR 1" integrating within the education platform service); and 2) features or applications/services provided by the education platform service. The administrative user account may utilize this recommendation to decide whether to include specific optional educational data fields in stored data mapping. The recommendation 382 may further provide links to return to specific GUI screens (e.g., to configure optional educational data fields, request more information about specific features/services, access telemetric reports, etc.). Furthermore, as shown in processing device view 380, a selection 384 is received of a command control feature to proceed to a "NEXT" GUI screen.

Figure 3I:
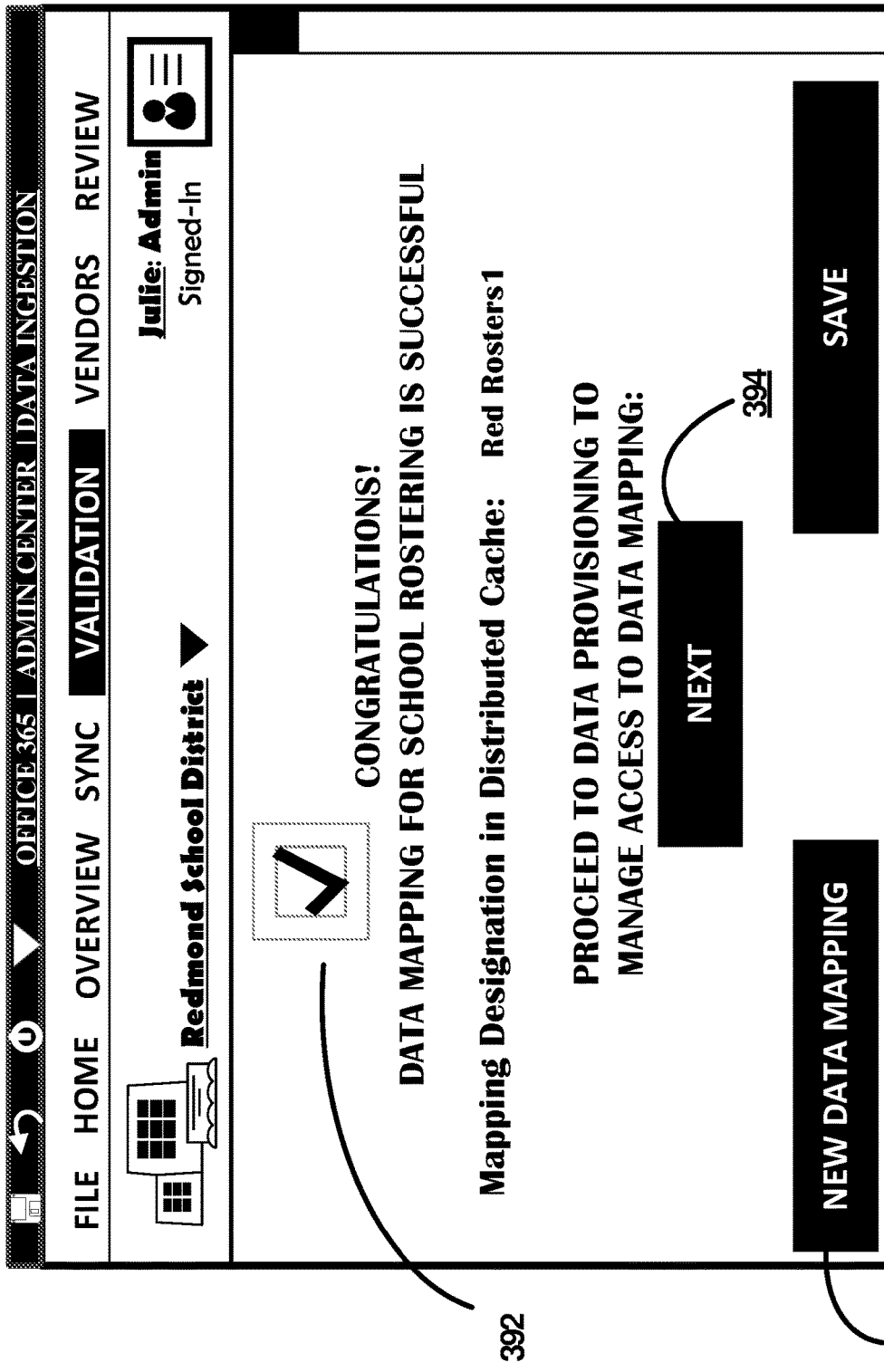

FIG. 3I presents processing device view 390, illustrating a continued example of an exemplary GUI 302 for an education platform service building off what is shown in processing device view 380 (FIG. 3H). Processing device view 390 illustrates an example of a GUI screen indicating completion of data mapping processing (including validation of data mapping errors). A first GUI notification element 392 indicates that the data mapping processing was successful. A second GUI notification element 394 provides the user with the ability access a stored data mapping (e.g., through the distributed cache storage). Additionally, the GUI shown in processing device view 390 provides the administrative user account with a GUI mapping feature 396 that enables the administrative user account to quickly initiate a new data mapping. The GUI mapping feature 396 may be useful when the administrative user account is managing more than one data profile and/or ingesting a plurality of different types of education data into the education platform service.

FIG. 4 illustrates a computing system 401 suitable for implementing processing operations described herein related to domain management via a software data platform, with which aspects of the present disclosure may be practiced. As referenced above, computing system 401 may be configured to implement processing operations of any component described herein including the orchestration management component(s). As such, computing system 401 may be configured to execute specific processing operations to solve the technical problems described herein, whereby processing operations are executed to improve processing with respect to data ingestion, data provisioning as well as provision of an improved user interface for data management (for output via a component of computing system 401 or another computing device). Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more applications or services. Computing system 401 may comprise a collection of devices executing processing for front-end applications/services, back-end applications/service or a combination thereof. Computing system 401 comprises, but is not limited to, a processing system 402, a storage system 403, software 405, communication interface system 407, and user interface system 409. Processing system 402 is operatively coupled with storage system 403, communication interface system 407, and user interface system 409. Non-limiting examples of computer system 401 comprise but are not limited to: smart phones, laptops, tablets, PDAs, desktop computers, servers, smart computing devices including television devices and wearable computing devices, e-reader devices, gaming consoles and conferencing systems, among other non-limiting examples.

Processing system 402 loads and executes software 405 from storage system 403. Software 405 includes one or more software components (e.g., 406a and 406b) that are configured to enable functionality described herein. In some examples, computing system 401 may be connected to other computing devices (e.g., display device, audio devices, servers, mobile/remote devices, etc.) to further enable processing operations to be executed. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity. Computing system 401 may further be utilized to execute system diagram 100 (FIG. 1), processing operations described in method 200 (FIG. 2) or the accompanying description of FIGS. 3A-3I.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, microprocessors, graphical processing units, application specific processors, sound cards, speakers and logic devices, gaming devices as well as any other type of processing devices, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for executing one or more orchestration management component(s) 406a as described herein. Software 405 may further comprise application/service component(s) 406b that provide applications/services as described in the foregoing description such as applications/services provided by software vendors or applications/services provided through a software data platform (e.g., education platform service), among other examples. While educational data is one example of data that integrated within a software data platform, it is to be understood that the present disclosure is intended to be enabled to work with any type of data without departing from the spirit of the present disclosure.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to execute specific processing components described herein as well as process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein including rendering of: an improved GUI for data management (including data ingestion and data provisioning); application command control for specific data management features; specific GUI menus and GUI elements specifically configured to improve data ingestion and data provisioning; presentation of data analytical insights; presentation of autocorrections and recommendations; presentation of telemetry data, or any combination thereof. User interface system 409 comprises a graphical user interface that presents graphical user interface elements representative of any point in the processing described in the foregoing description including processing operations described in system diagram 100 (FIG. 1), method 200 (FIG. 2) and front-end representations related to the description of FIGS. 3A-3I. A graphical user interface of user interface system 409 may further be configured to display graphical user interface elements (e.g., data fields, menus, links, graphs, charts, data correlation representations and identifiers, etc.) that are representations generated from processing described in the foregoing description. Exemplary applications/services may further be configured to interface with processing components of computing device 401 that enable output of other types of signals (e.g., audio output) in conjunction with operation of exemplary applications/services (e.g., education platform service) described herein.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), HTTPS REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method comprising:
providing, via an education platform service, a graphical user interface (GUI) for interacting with the education platform service, the GUI providing an interface for selecting a data file for integrating into a synchronized education profile;
receiving, via the GUI of the education platform service from an administrative user account of one or more educational institutions, a selection of the data file and a request to integrate data of the data file into the synchronized education profile, stored on the education platform service, that is managed by the administrative user account;
generating, by artificial intelligence processing of the education platform service, data analytics insight data pertaining to data mapping processing for the synchronized education profile, wherein the artificial intelligence processing generates the data analytics insights based on signal data comprising account activity data of the administrative user account;
in response to receiving the selection and the request, automatically executing the data mapping processing that utilizes the data analytics insight data to generate a data mapping that maps the data of the data file to educational data fields associated with the synchronized education profile;
validating the data mapping to produce a validation check, including by correlating header data of the data file with the educational data fields of the synchronized education profile;
presenting, to the administrative user account through the GUI of the education platform service, the validation check of the data mapping comprising a view of at least a portion of the data mapping and selectable options for navigating through the data mapping and for navigating through recommendations associated with the data mapping, wherein the recommendations associated with the data mapping are based on the data analytics insight data and are provided in a natural language format;
in response to receiving, via the GUI of the education platform service, selection of a selectable option of the selectable options, presenting, through the GUI of the education platform service, an action recommendation based on the data analytics insight data relevant to the selection, the action recommendation comprising a recommendation to perform an action related to the data file that enables additional features of the education platform service;
receiving, via the GUI of the education platform service, selection of the action recommendation; and
in response to receiving the selection of the action recommendation, performing the action and enabling the additional features.

2. The computer-implemented method of claim 1, further comprising:
receiving, through the GUI, a confirmation of the data mapping from the administrative user account; and
in response to a receipt of the confirmation of the data mapping, storing the data mapping on a distributed data storage of the education platform service that is accessible to only the administrative user account, wherein the storing comprises creating an association between the data mapping and the synchronized education profile for subsequent usage through the education platform service.

3. The computer-implemented method of claim 1, wherein the automatically executing of the data mapping processing comprises:
determining required educational data fields that pertain to a current configuration of the synchronized education profile relative to one or more of: services of the education platform service and services associated with one or more software vendors, and
determining optional educational data fields that, if activated, would modify a user experience for users associated with the synchronized education profile relative to one or more of: the services of the education platform service and the services associated with the one or more software vendors, and
wherein the presenting disambiguates, in the validation check of the data mapping presented through the GUI, the required educational data fields from the optional educational data fields.

4. The computer-implemented method of claim 1, wherein the account activity data of the administrative user account includes a past interaction with the data mapping processing.

5. The computer-implemented method of claim 1, further comprising:
in response to the automatically executing of data mapping processing, determining a data mapping error, wherein the presenting presents the data mapping error in the validation check to aid resolution of the data mapping error by the administrative user account.

6. The computer-implemented method of claim 5, further comprising:
utilizing the data analytics insight data to recommend an input value for one or more of the educational data fields associated with the data mapping error, wherein a recommendation for the input value is provided in the validation check to aid resolution of the data mapping error.

7. The computer-implemented method of claim 5, further comprising:
utilizing the data analytics insight data to generate an autocorrection of the data mapping error, wherein the presenting of the validation check comprises presenting a GUI element identifying the autocorrection of the data mapping error.

8. The computer-implemented method of claim 7, further comprising:
providing, through the GUI, a specific data insight identifying, for the administrative user account, a reason for the autocorrection, wherein the specific data insight identifies at least one detail that is reflective of a collective analysis of synchronized education profiles associated with the administrative user account, services provided through the educational platform service, and one or more software vendors.

9. A system comprising:

at least one processor; and a memory, operatively connected with the at least one processor, storing computer- executable instructions that, when executed by the at least one processor, causes the at least one processor to execute a method that comprises:

providing, via an education platform service, a graphical user interface (GUI) for interacting with the education platform service, the GUI providing an interface for selecting a data file for integrating into a synchronized education profile;

receiving, via the GUI of the education platform service from an administrative user account of one or more educational institutions, a selection of the data file and a request to integrate data of the data file into the synchronized education profile, stored on the education platform service, that is managed by the administrative user account, generating, by artificial intelligence processing of the education platform service, data analytics insight data pertaining to data mapping processing for the synchronized education profile, wherein the artificial intelligence processing generates the data analytics insights based on signal data comprising account activity data of the administrative user account, in response to receiving the selection and the request, automatically executing the data mapping processing that utilizes the data analytics insight data to generate a data mapping that maps the data of the data file to educational data fields associated with the synchronized education profile, validating the data mapping to produce a validation check, including by correlating header data of the data file with the educational data fields of the synchronized education profile;

presenting, to the administrative user account through the GUI of the education platform service, the validation check of the data mapping comprising a view of at least a portion of the data mapping and selectable options for navigating through the data mapping and for navigating through recommendations associated with the data mapping, wherein the recommendations associated with the data mapping are based on the data analytics insight data and are provided in a natural language format;

in response to receiving, via the GUI of the education platform service, selection of a selectable option of the selectable options, presenting, through the GUI of the education platform service, an action recommendation based on the data analytics insight data relevant to the selection, the action recommendation comprising a recommendation to perform an action related to the data file that enables additional features of the education platform service;

receiving, via the GUI of the education platform service, selection of the action recommendation; and in response to receiving the selection of the action recommendation, performing the action and enabling the additional features.

10. The system of claim 9, wherein the method, executed by the at least one processor, further comprises:

receiving, through the GUI, a confirmation of the data mapping from the administrative user account; and in response to a receipt of the confirmation of the data mapping, storing the data mapping on a distributed data storage of the education platform service that is accessible to only the administrative user account, wherein the storing comprises creating an association between the data mapping and the synchronized education profile for subsequent usage through the education platform service.

11. The system of claim 9, wherein the automatically executing of the data mapping processing comprises:

determining required educational data fields that pertain to a current configuration of the synchronized education profile relative to one or more of: services of the education platform service and services associated with one or more software vendors, and determining optional educational data fields that, if activated, would modify a user experience for users associated with the synchronized education profile relative to one or more of: the services of the education platform service and the services associated with the one or more software vendors, and wherein the presenting disambiguates, in the validation check of the data mapping presented through the GUI, the required educational data fields from the optional educational data fields.

12. The system of claim 9, wherein the artificial intelligence processing generates the data analytics insights based on signal data further comprising services of the education platform service associated with the synchronized education profile.

13. The system of claim 9, wherein the method, executed by the at least one processor, further comprises:

in response to the automatically executing of data mapping processing, determining a data mapping error, wherein the presenting presents the data mapping error in the validation check to aid resolution of the data mapping error by the administrative user account.

14. The system of claim 13, wherein the method, executed by the at least one processor, further comprises:

utilizing the data analytics insight data to recommend an input value for one or more of the educational data fields associated with the data mapping error, wherein a recommendation for the input value is provided in the validation check to aid resolution of the data mapping error.

15. The system of claim 13, wherein the method, executed by the at least one processor, further comprises:

utilizing the data analytics insight data to generate an autocorrection of the data mapping error, wherein the presenting of the validation check comprises presenting a GUI element identifying the autocorrection of the data mapping error.

16. The system of claim 15, wherein the method, executed by the at least one processor, further comprises:

providing, through the GUI, a specific data insight identifying, for the administrative user account, a reason for the autocorrection, wherein the specific data insight identifies at least one detail that is reflective of a collective analysis of synchronized education profiles associated with the administrative user account, services provided through the educational platform service, and one or more software vendors.

17. A computer-readable storage media storing computer-executable instructions that, when executed by at least one processor, cause the at least one processor to execute a method comprising:
   providing, via an education platform service, a graphical user interface (GUI) for interacting with the education platform service, the GUI providing an interface for selecting a data file for integrating into a synchronized education profile;
   receiving, via the GUI of the education platform service from an administrative user account of one or more educational institutions, a selection of the data file and a request to integrate data of the data file into the synchronized education profile, stored on the education platform service, that is managed by the administrative user account;
   generating, by artificial intelligence processing of the education platform service, data analytics insight data pertaining to data mapping processing for the synchronized education profile, wherein the artificial intelligence processing generates the data analytics insights based on signal data comprising account activity data of the administrative user account;
   in response to receiving the selection and the request, automatically executing the data mapping processing that utilizes the data analytics insight data to generate a data mapping that maps the data of the data file to educational data fields associated with the synchronized education profile;
   validating the data mapping to produce a validation check, including by correlating header data of the data file with the educational data fields of the synchronized education profile;
   presenting, to the administrative user account through the GUI of the education platform service, the validation check of the data mapping comprising a view of at least a portion of the data mapping and selectable options for navigating through the data mapping and for navigating through recommendations associated with the data mapping, wherein the recommendations associated with the data mapping are based on the data analytics insight data and are provided in a natural language format;
   in response to receiving, via the GUI of the education platform service, selection of a selectable option of the selectable options, presenting, through the GUI of the education platform service, an action recommendation based on the data analytics insight data relevant to the selection, the action recommendation comprising a recommendation to perform an action related to the data file that enables additional features of the education platform service;
   receiving, via the GUI of the education platform service, selection of the action recommendation; and
   in response to receiving the selection of the action recommendation, performing the action and enabling the additional features.

18. The computer-readable storage media of claim 17, wherein the automatically executing of the data mapping processing comprises:
   determining required educational data fields that pertain to a current configuration of the synchronized education profile relative to one or more of: services of the education platform service and services associated with one or more software vendors, and
   determining optional educational data fields that, if activated, would modify a user experience for users associated with the synchronized education profile relative to one or more of: the services of the education platform service and the services associated with the one or more software vendors, and
   wherein the presenting disambiguates, in the validation check of the data mapping presented through the GUI, the required educational data fields from the optional educational data fields.

19. The computer-readable storage media of claim 17, wherein the method, executed by the at least one processor, further comprising:
   in response to the automatically executing of data mapping processing, determining a data mapping error; and
   utilizing the data analytics insight data to recommend an input value for one or more of the educational data fields associated with the data mapping error, wherein the presenting presents the data mapping error and a recommendation for the input value in the validation check to aid resolution of the data mapping error by the administrative user account.

20. The computer-readable storage media of claim 17, wherein the method, executed by the at least one processor, further comprising:
   in response to the automatically executing of data mapping processing, determining a data mapping error; and
   utilizing the data analytics insight data to generate an autocorrection to resolve the data mapping error, wherein the presenting of the validation check comprises presenting, in the GUI, the autocorrection proximate to an identification of the data mapping error.

* * * * *